United States Patent
Billapati et al.

(10) Patent No.: US 10,339,113 B2
(45) Date of Patent: Jul. 2, 2019

(54) METHOD AND SYSTEM FOR EFFECTING INCREMENTAL CHANGES TO A REPOSITORY

(71) Applicant: Oracle International Corporation, Redwood Shores (CA)

(72) Inventors: Anil Billapati, Milpitas, CA (US); Roshni Ramesh, Bangalore (IN); Madhan Kumar Dk, Redwood Shores, CA (US); Kerry Macarthur, Spring Hill, FL (US); Venkatesh Nayak, Redwood Shores, CA (US); Vinay Kompella, Bangalore (IN); Girish Pradhan, San Ramon, CA (US); Darshan Kumar, San Ramon, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 319 days.

(21) Appl. No.: 14/492,469

(22) Filed: Sep. 22, 2014

(65) Prior Publication Data
US 2015/0088815 A1    Mar. 26, 2015

Related U.S. Application Data

(60) Provisional application No. 61/880,904, filed on Sep. 21, 2013.

(51) Int. Cl.
*G06F 17/30*   (2006.01)
*G06F 7/00*    (2006.01)
*G06F 16/21*   (2019.01)

(52) U.S. Cl.
CPC .................. *G06F 16/21* (2019.01)

(58) Field of Classification Search
CPC ........................ G06F 17/30289; G06F 16/21
USPC ......................................................... 707/609
See application file for complete search history.

(56) References Cited

U.S. PATENT DOCUMENTS

| | | | |
|---|---|---|---|
| 5,680,621 A | 10/1997 | Korenshtein | 395/705 |
| 5,729,743 A | 3/1998 | Squibb | 395/619 |
| 6,161,109 A | 12/2000 | Matamoros et al. | 707/203 |
| 7,735,062 B2 * | 6/2010 | de Seabra e Melo | G06F 9/451 717/120 |
| 7,827,528 B2 * | 11/2010 | Sattler | G06F 8/71 709/221 |

(Continued)

FOREIGN PATENT DOCUMENTS

WO   WO2013/0153063   10/2013   ............ G06F 17/30

OTHER PUBLICATIONS

Oracle Data Sheet: "Incremental Repository Merge for Siebel CRM Applications," pp. 1-7, http://www.oracle.com/us/products/applications/atg/siebel-tools-irm-1915961.pdf.

(Continued)

*Primary Examiner* — Kuen S Lu
(74) *Attorney, Agent, or Firm* — Sheppard Mullin Richter & Hampton LLP

(57) ABSTRACT

A method, system, and computer-program product for effecting incremental changes to a repository are disclosed. The method includes receiving an incremental feature package and applying the one or more revisions to the repository. In such methods, systems, and computer-program products, the incremental feature package includes one or more revisions to be made to a repository.

20 Claims, 25 Drawing Sheets

(56) References Cited

U.S. PATENT DOCUMENTS

| | | | |
|---|---|---|---|
| 8,527,478 B1 | 9/2013 | Goldman et al. | 707/695 |
| 8,533,258 B2 | 9/2013 | Parker, III et al. | 709/203 |
| 2005/0262107 A1* | 11/2005 | Bergstraesser | G06F 17/30607 |
| 2006/0277286 A1* | 12/2006 | Zhang | G06F 17/30867 |
| | | | 709/223 |
| 2008/0052541 A1* | 2/2008 | Ginter | G06F 21/10 |
| | | | 713/194 |
| 2013/0298114 A1 | 11/2013 | Taylor et al. | 717/168 |
| 2014/0279420 A1* | 9/2014 | Okerlund | G06Q 40/00 |
| | | | 705/39 |

OTHER PUBLICATIONS

"Delta Process," http://help.sap.com/saphelp_nw04/helpdata/en/84/81eb588fc211d4b2c90050da4c74dc/content.htm.

* cited by examiner

Tagging Schema 1100

User Schema 1110

| ID | Employee |
|----|----------|
| U1 | User1 |
| U2 | User2 |
| U3 | User3 |

User Tag Schema 1120

| ID | TagId | UserId |
|----|-------|--------|
| A | 1 | U1 |
| B | 1 | U2 |
| C | 2 | U3 |

Tag Schema 1130

| ID | Name |
|----|------|
| 1 | CMU |
| 2 | TNT |

Object Tag Schema 1140

| ID | Tag Name | Object Path | Object Type | Object Updated |
|----|----------|-------------|-------------|----------------|
| X | CMU | Order‖ListPrice‖FUP1 | Fld User Prop | Datetime |
| Y | CMU | Order‖NetPrice‖ | Field | Datetime |
| Z | TNT | Order‖ListPrice‖FUP2 | Fld User Prop | Datetime |

*Fig. 11*

METHOD AND SYSTEM FOR EFFECTING INCREMENTAL CHANGES TO A REPOSITORY

CROSS-REFERENCE TO RELATED APPLICATIONS

The present patent application claims priority to Provisional Patent Application Ser. No. 61/880,904, filed Sep. 21, 2013, and entitled "Method and System for Effecting Incremental Changes To A Repository," which is hereby incorporated by reference herein, in its entirety and for all purposes.

FIELD OF THE INVENTION

The present invention relates to implementing revisions, upgrades, new features, customizations and the like to applications, and, more particularly, to a method and system for effecting incremental changes to a repository.

BACKGROUND OF THE INVENTION

As digital sources of information have become increasingly important in the business, academic and personal computing arenas, improved mechanisms for quickly and efficiently implementing new functionality in the applications that manage and present such information have also become increasingly important.

As will be appreciated, repositories can become large, and it can be difficult to identify changes made to such metadata in a meaningful manner and to use that information for improving business agility. Upgrades tend to be expensive and time consuming, requiring large, experienced teams to implement upgrades. Upgrading to new releases typically involves extensive testing of the entire application suite (as new releases have modifications and additions to metadata objects in addition to customers' modifications to original metadata objects). As a result, organizations often have a tendency to avoid upgrading their present systems to new releases, as a result of the difficulties presented by existing upgrade processes, which are cumbersome and resource-intensive. Often, then, such organizations will avoid upgrading their systems, sometimes for years, and thus fail to benefit from the advances they might enjoy by employing such upgraded systems.

SUMMARY OF THE INVENTION

In one embodiment, a method, system, and computer-program product for effecting incremental changes to a repository are disclosed. The method includes receiving an incremental feature package and applying the one or more revisions to the repository. In such methods, systems, and computer-program products, the incremental feature package includes one or more revisions to be made to a repository.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from concepts such as those disclosed herein and their broader aspects. Other aspects, inventive features, and advantages of systems according to the concepts disclosed herein will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

FIG. 11 is a simplified block diagram illustrating examples of tagging schema, according to embodiments of the methods and systems disclosed herein.

Figure 1:
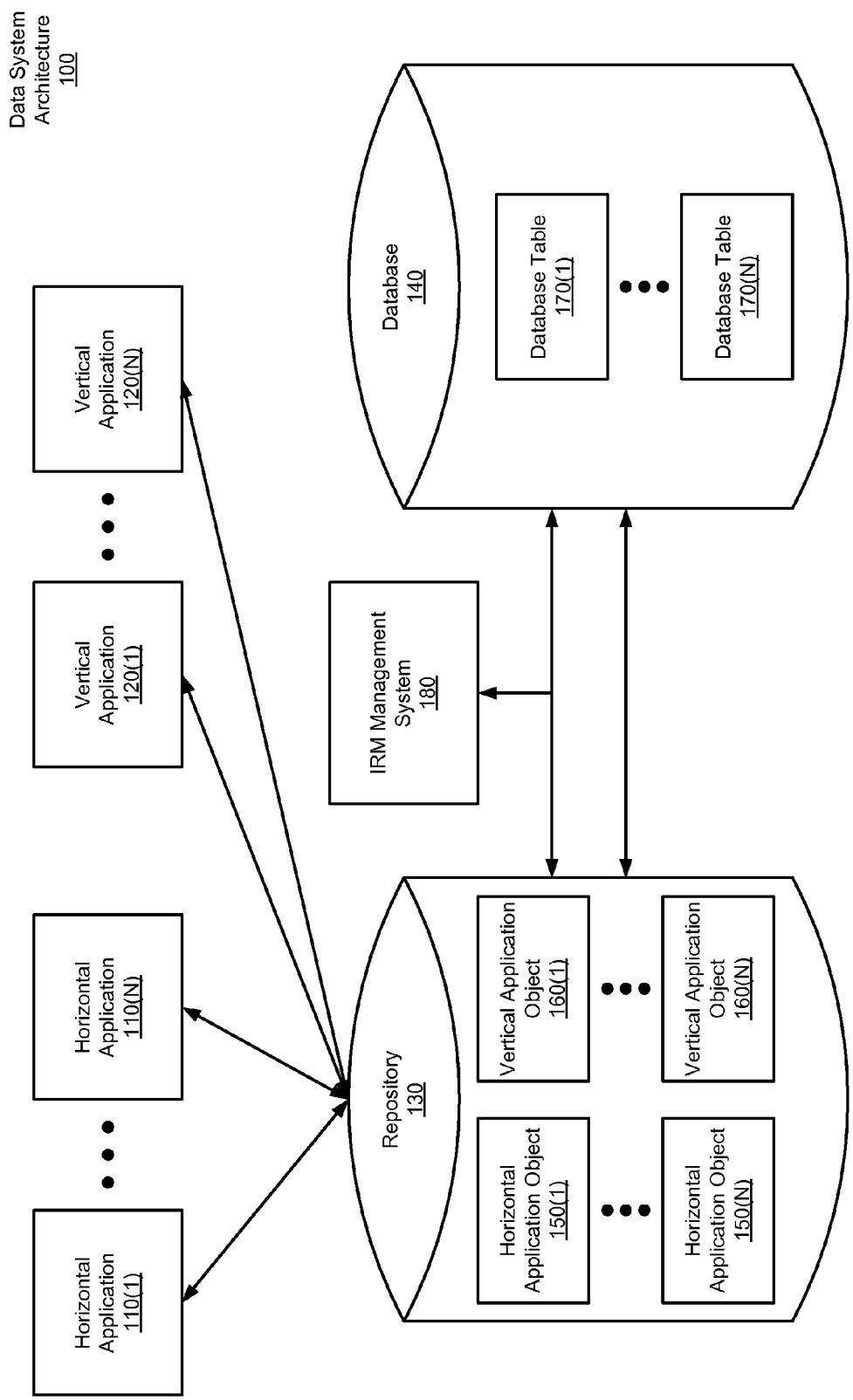
FIG. 1 is a simplified block diagram illustrating an example of a data system architecture configured to support incremental repository merge operations, according to embodiments of the methods and systems disclosed herein.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the systems described herein and equivalents thereof, as defined solely by the claims, will become apparent in view of the examples described in the detailed description set forth below.

DETAILED DESCRIPTION

The following is intended to provide a detailed description of an example of the invention and should not be taken to be limiting of the invention itself. Rather, any number of variations may fall within the scope of the invention which is defined in the claims following the description.

Introduction

Systems such as those described herein provide methods and apparati for effecting incremental changes to a repository. Such systems provide the ability to identify incremental changes to a repository (e.g., in which metadata artifacts used for business logic is stored) using what is referred to herein as object tagging. Embodiments of systems such as those disclosed herein reduce the cost of uptake of products releases and other updates (generally referred to herein as incremental feature packages) through incremental upgrades and increase business agility for users. Such systems also help customers with increased agility in their internal custom releases, and so provide the ability to release innovations and go to market faster. Such feature packages can include one or more of repository changes (e.g., updates and/or modifications to repositories), program code (as, e.g., executables, dynamic link libraries, or the like), seed data, schema (as, e.g., data and and/or files containing structured query language (SQL) or the like).

Mechanisms such as those described herein support the creation and deployment of customizations to a variety of applications. An update methodology that employs incremental repository merge (IRM) techniques, such as those described herein, offers a set of features within tools employing such techniques that makes importing incremental feature packages and customer-authored innovations easier and faster. Such tools, by employing such incremental repository merge techniques, enable a more agile approach to application development/customization/maintenance by customers, and easier application of incremental feature packages.

IRM-based approaches, such as those disclosed herein, provide for agile customer development, supporting, for example, parallel development, aided by the more frequent merges made possible by such an architecture. Typically, while it is preferable for only one developer at a time to check out an object, the changes made can be more quickly applied to all affected environments since the update files (referred to herein as delta files) are smaller, with less information to compare, when merged into another repository. Thus, such delta files can be created and imported more easily and more quickly than by other updating methods.

By using IRM-based approaches, the concept of object tagging (discussed further below) is employed to identify objects and metadata artifacts that have been newly-added or modified through the development process, and only import and update those delta objects during, for example, an upgrade to a new product release. This significantly reduces the time taken to complete upgrades, and also reduces the cost involved with testing the application post-upgrade. Features can include, for example:

Processes and data models for tracking changes to repository metadata objects during development and maintenance of new application features Use of such artifacts to identify the delta of the repository that has changed Optimized processes to restrict repository merge to those new and updated objects/metadata artifacts Post-merge conflict resolution (e.g., to decide which change to preserve, customer changes or manufacturer changes) can be restricted to only those modified delta objects (and thus, to the more important conflicts)

Processes to track changes to metadata per application module (object tagging, for example on a per-repository basis)

Ability to ship metadata changes per application for customers to uptake only the content related to their industry of choice (using, e.g., delta files)

Processes to display the list of changes post-merge (including, e.g., manufacturer-delivered changes and customer changes) in a hierarchical manner, in order to permit the identification of dependencies on unchanged objects so as identify the objects to be tested.

These and other advantages are discussed in greater detail below.

IRM-based approaches, such as those disclosed herein, can employ aggregations of changes to maintain and effect such changes in an incremental manner. Such incremental changes can be aggregated into one of more files (referred to herein as delta files), for example, which can be created such that the file(s) contain information regarding only the objects changed. Unlike other approaches (in which the entire definition of an object is stored and conveyed when updating a repository), a delta file includes only the information necessary to define the changes made/to be made to the object in question. This allows delta files to be smaller, with less information, and so reduce the computing resources needed to prepare, store, communicate, and install such changes. When importing delta files into a target repository, then, import and merge operations are much quicker, as less information must be compared between the target repository and the data in the delta file(s). Such delta files can be created using a number of bases for tagging, including point-in-time information (e.g., time and date at which the objects were updated/modified), location, developer identity, group membership of the developer, objects modified/permissions, a development tag created using object tagging, and/or other such characteristics, as well as combination thereof. Such control allows fine granularity in tracking changes to objects, as well as what content can/should be moved from one environment to another.

Another improvement offered by the development capabilities described herein is the implementation of object tagging. Object tagging associates developers with a specific tag or tags. When a developer works on a given object using the tools described herein, a tag under which to perform such work is chosen (automatically, by the system, and/or manually, by the developer (either directly or by modifying automatic selections)). The work performed can then be logged to new tables, such that there is a record of the work performed. Functionality enabled by such an approach includes the generation of warnings/alerts, upon a developer's attempt to overwrite that of another developer. Additionally, administrators can view reports of these developer conflicts in views in the user interface. The use of object tagging also allows developers to further delineate their work, even within the definitions of an object. Subsequently, using tags such as those described herein, developers can extract the work they have performed (under a given tag, or combinations of tags (using, e.g., tag expressions to logically combine the tags)), package this work (e.g., the modified objects), and moved such packages between environments. Systems according to embodiments of systems such as those disclosed herein can provide one or more screens and views for developer tag administration and viewing developer conflicts and work.

This granularity also provides a unique opportunity for functionality that can be used to identify changes to a repository modified in the manner. For example, such information can be used as the basis for tools that provide for visual comparison of workflows and tasks. Such a utility allows developers to visually compare two workflow processes or tasks. Heretofore, much of the time after an upgrade is spent tediously inspecting what might have changed between two workflow processes or two tasks. With a utility such as a workflow/task visual comparison tool, finding changes is nearly instantaneous. For example, a user can select any step to get a side-by-side comparison of the properties for that step in each version of the process or task, which allows for side-by-side comparison of a step from each workflow process version.

As noted, deployment of repository modifications is also improved. To this end, a deployment wizard can be created that makes the installation of incremental feature packages even simpler, faster, and easier than would otherwise be the case. Such a deployment wizard combines operations common to the installation of IRM packages, including:

Applying logical schema to the physical database
Importing seed data for selected languages
Three-way merging (existing features, original manufacturer features, and customer features).

Functionality such as that described herein also enables the fast and efficient creation of hierarchical merge conflict reports. Using an IRM package such as that described herein, flat views of merge conflict data can be transformed and presented in a report (referred to herein as a hierarchical merge conflict report) that allows developers to examine the tree of a particular object and see exactly what has changed. Furthermore, if an object on which the currently selected object depends has changed, developers can drill down on that object and determine the manner in which the object changed, in order to get a better idea of the testing effort involved. This makes the task of resolving conflicts faster and easier, as well as providing insight for testing efforts after a merge operation has been performed. Such a hierarchical merge conflict report improves readability of such reports by providing a hierarchical list of objects (e.g., in an object explorer view that includes objects modified as part of the IRM process, as well as objects directly or indirectly dependent on those modified objects). User screens allow a user to view an object explorer, an object list with upgrade related information, and attribute changes made to the object selected. Using the functionality of the methods and systems disclosed herein, users can explore the entire hierarchy of an object and dependent objects, and also allows support for predefined queries. Such predefined queries can include changes by the manufacturer and modifications by the end-user/third-party (indicating conflicts caused by objects changed by the manufacturer and end-user/third-party), changes by the manufacturer only, and all changes (e.g., a list of all conflicts), among others.

An incremental repository merge according to the methods and system disclosed herein provide a number of advantages. For example, systems such as those described herein provide for small, transportable innovations and features. Further, updates and other changes to repository objects can be marked with "tags" that allow fine granularity in packaging customizations and effecting such changes, as well as the generation of hierarchical reports of merge conflicts Implementation of such tags also allows for support of administrative features (e.g., user interface screens) for tags and developer conflicts. Such systems can also provide for the visual comparison of two workflow processes or tasks. Further, simplification of the updating customers' repositories, such installations can be consolidated into single repositories, thereby enabling the delivery of more application, platform and integration products, their distribution and installation being simplified sufficiently to allow for such scenarios. Such a shift to a single repository also provides user with broader set of features and functionalities, and reduces the overall deployment and maintenance cost associated with such systems.

By implementing the methods and systems described herein, developers (business analysts, programmers, and other such individuals) are able to work in parallel much more easily and synchronize their work more frequently. Such developers are able to more quickly identify and resolve important merge conflicts (e.g., through being alerted when one party's work is overwriting that of another). Administrators can also manage development efforts using such techniques, and are able to identify and resolve workflow and/or task differences more quickly.

Thus, through the use of IRM-based approaches, the cost of upgrading to newer versions of a manufacturer's product can be reduced by more than 50%; parallel development, using object tagging and a single repository source, can be accomplished; it becomes possible to release only tested metadata changes from development to production; changes to repositories can be rolled back, if such changes cannot be fully/sufficiently tested to meet the production criteria; and reporting can focus on delta changes, thereby optimizing testing costs for the end-user organization.

Examples of IRM-Based Embodiments

FIG. 1 is a simplified block diagram illustrating an example of a data system architecture configured to support incremental repository merge operations, according to embodiments of the methods and systems disclosed herein. Such a data system architecture (depicted in FIG. 1 as a data system architecture 100) includes a number of horizontal applications (depicted in FIG. 1 as horizontal applications 110(1)-N)) and a number of vertical applications (depicted in FIG. 1 as vertical application 120(1)-(N)). Horizontal applications 110(1)-(N) and vertical applications 120(1)-(N) are coupled to a repository 130, which, in turn, is coupled to a database 140. Repository 130 can store a variety of information, including a number of schemas, objects, and components. As depicted in FIG. 1, repository 130 stores a number of horizontal application objects (depicted in FIG. 1 as horizontal application objects 150(1)-(N)) and vertical application objects (depicted in FIG. 1 as vertical application object 160(1)-(N)). Also stored in repository 130 are a number of schemas (not shown), which provide a logical view of the information stored in database 140. In contrast, database 140 stores a physical representation of the actual application data, according to a physical model used to store such data (a physical view of such data). This physical representation is depicted in FIG. 1 as database tables 170(1)-(N).

Horizontal applications include functionalities related, for example, to common enterprise functions, such as human resources and other human capital management functions, accounting, inventory control, and the like. Thus, as will be appreciated in light of the present disclosure, horizontal applications 110(1)-(N) represent applications that can be used across industries to provide such common enterprise functions. By contrast, vertical applications such as vertical applications 120(1)-(N) provide functionality directed to specific industries, such as the airline industry, the communications industry, the oil and gas industry, the healthcare industry, the automotive industry, and so on.

As will be appreciated in light of the present disclosure, the schemas stored in repository 130 support common and industry-specific function by providing an abstraction layer between the various applications and the data stored in database 140. Thus, such schemas present data (e.g., stored in database tables 170(1)-(N)) in a manner expected by those applications. These and other constructs provide for the definition of objects (e.g., object definitions) included in repository 130 and database 140. An object definition, as used herein, comprehends the metadata that defines an application. Such object definitions can be used to define user interface elements that are included, for example, in a client used to access database information, in business entities, and in database organization. A repository is a set of database tables that stores these object definitions. Examples of types of objects include applets, views, business components, and tables, which can be created or modified by creating or modifying an object definition therefor. An object definition includes properties, which are qualities of the software construct that the object defines. For example, the properties of a database column can include the name, data type, and length of the column.

As will be appreciated in light of the present disclosure, repository 130 and database 140 can become large, and it can be difficult to identify changes made to such metadata in a meaningful manner and to use that information for improving business agility. Thus, data system architecture 100 provides an IRM management system 180 in order to support IRM functions such as those described herein. Without IRM management system 180 (and the IRM-based techniques embodied therein), upgrades to repository 130 and database 140 would be expensive and time consuming, requiring large, experienced teams to implement upgrades. By supporting such techniques, data system architecture 100 simplifies upgrades to repository 130 and database 140, and minimizes the resources involved in such upgrades (e.g., time, personnel, computing resources, and so on). As a result, organizations employing such functionalities perform needed upgrades on a more regular basis, and can do so with significantly fewer resources.

Figure 2:
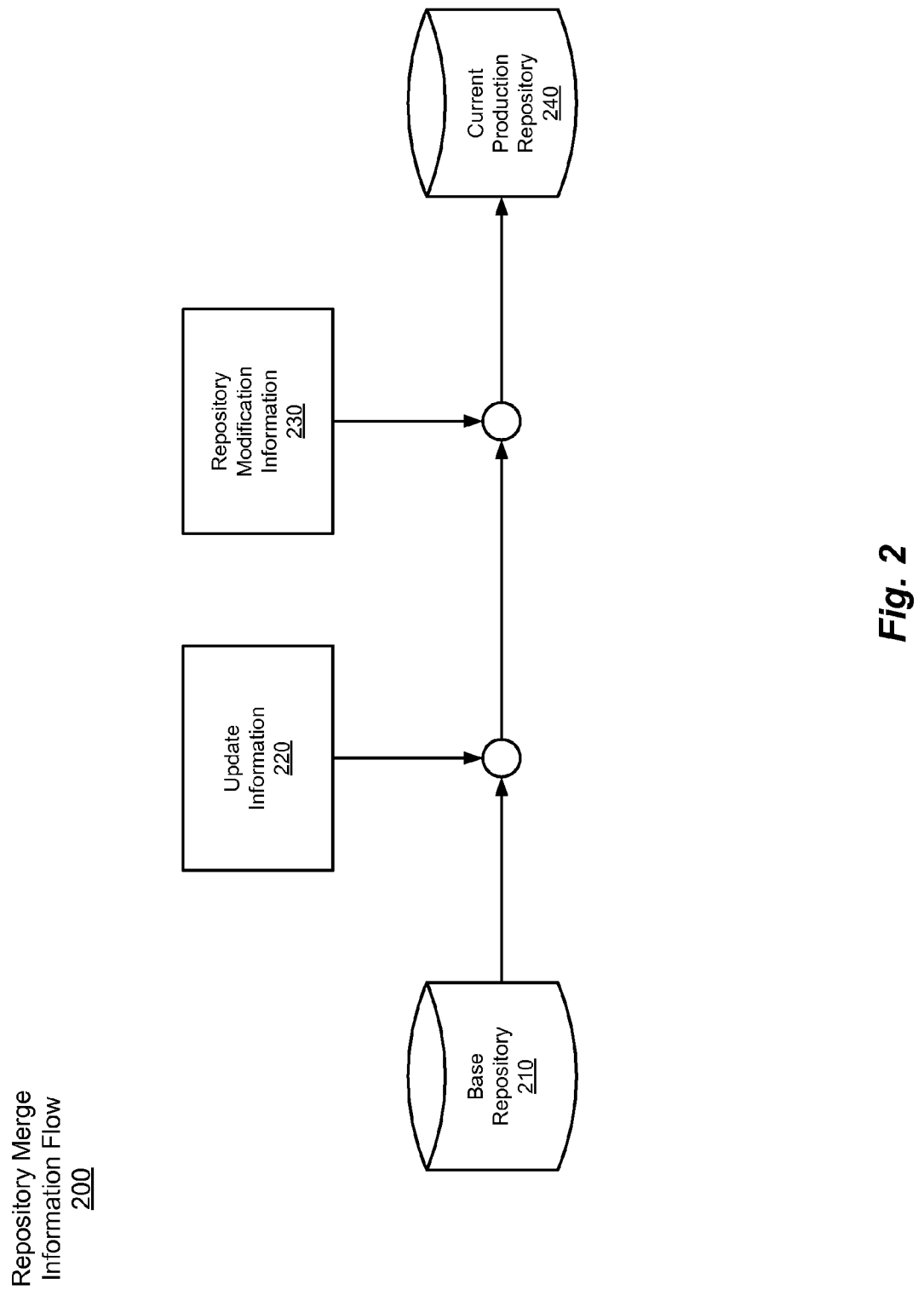
FIG. 2 is a simplified block diagram illustrating an example of a repository merge information flow, according to embodiments of the methods and systems disclosed herein.

FIG. 2 is a simplified block diagram illustrating an example of a repository merge information flow 200, according to embodiments of the methods and systems disclosed herein. Repository merge information flow 200 illustrates examples of the operations that can be performed in applying updates and modifications to a repository, in order to accomplish tasks such as upgrading a repository, applying end-user modifications to a repository, and the like. Repository merge information flow 200 includes, as its starting point, a base repository 210. As noted earlier, a repository such as base repository 210 includes metadata that provides a logical construction (also referred to herein as a logical view or logical schema) for the interpretation of data stored in an associated database (also referred to herein as a physical view or physical schema). Base repository 210 is updated using update information 220. The updated repository (not shown) is then modified using repository modification information 230. The requisite updating and modification of base repository 210 results in a new repository, which appears in FIG. 2 as a current production repository 240. As will be appreciated in view of the present disclosure, updating and modification are merely examples of the operations that can be performed on base repository 210, and the order thereof can be changed to suit the situation at hand. Further, an example of update information 220 is an upgrade package from the repository's manufacturer. Similarly, repository modification information 230 can be, for example, customizations made by an end-user, a third-party (e.g., add-on modules from third-party vendors), and/or other such entities. As will be appreciated, the efficiency with which updates and modifications can be made to a repository such as base repository 210 are often of concern. To this end, the performance of such operations can be improved using the IRM-based approaches described herein, as well as tagging techniques such as those described in connection with FIGS. 8-18E.

Figure 3:
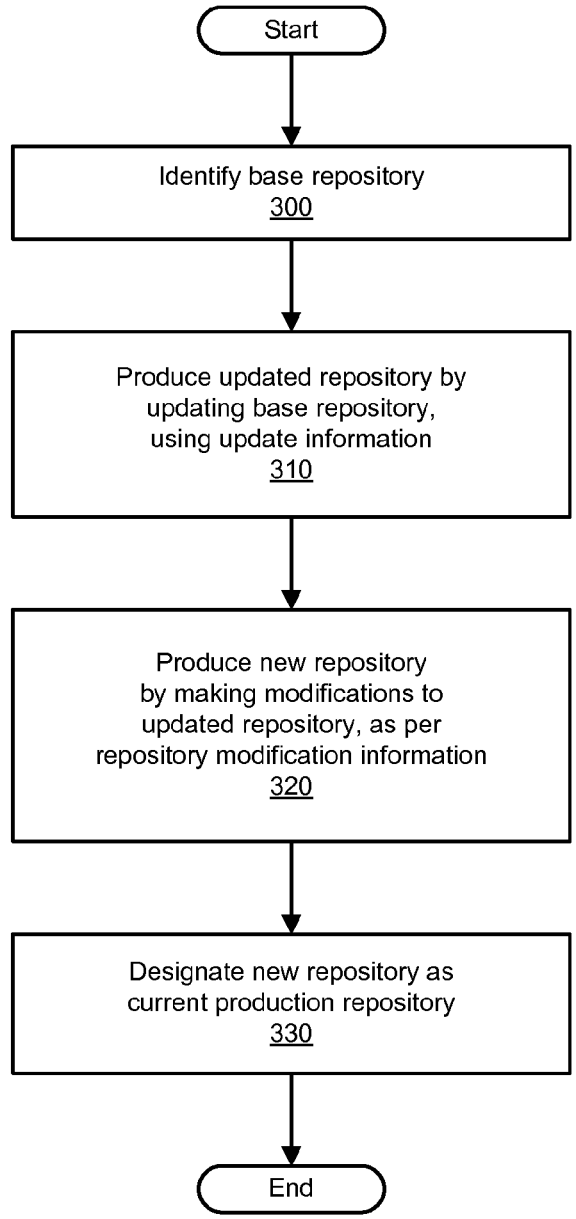
FIG. 3 is a simplified flow diagram illustrating an example of a process for performing a repository merge operation, according to embodiments of the methods and systems disclosed herein.

FIG. 3 is a simplified flow diagram illustrating an example of a process for performing a repository merge operation, according to embodiments of the methods and systems disclosed herein. The process depicted in FIG. 3 begins with the identification of a base repository, such as base repository 210 of FIG. 2 (step 300). Next, an updated repository is produced by updating the base repository, which can be accomplished by applying the updates in the relevant update information (e.g., update information 220 of FIG. 2) (step 310). Once an updated repository has been produced, a new repository (e.g., current production repository 240 of FIG. 2) is produced by making modifications to the updated repository, as per repository modification information (e.g., repository modification information 230 of FIG. 2) (step 320). As will be appreciated in light of the present disclosure, such update and modification information is incremental in nature, when employing IRM-based methods and systems such as those described herein. The new repository having been produced in this fashion, such new repository is designated as the current production repository (step 330).

Figure 4:
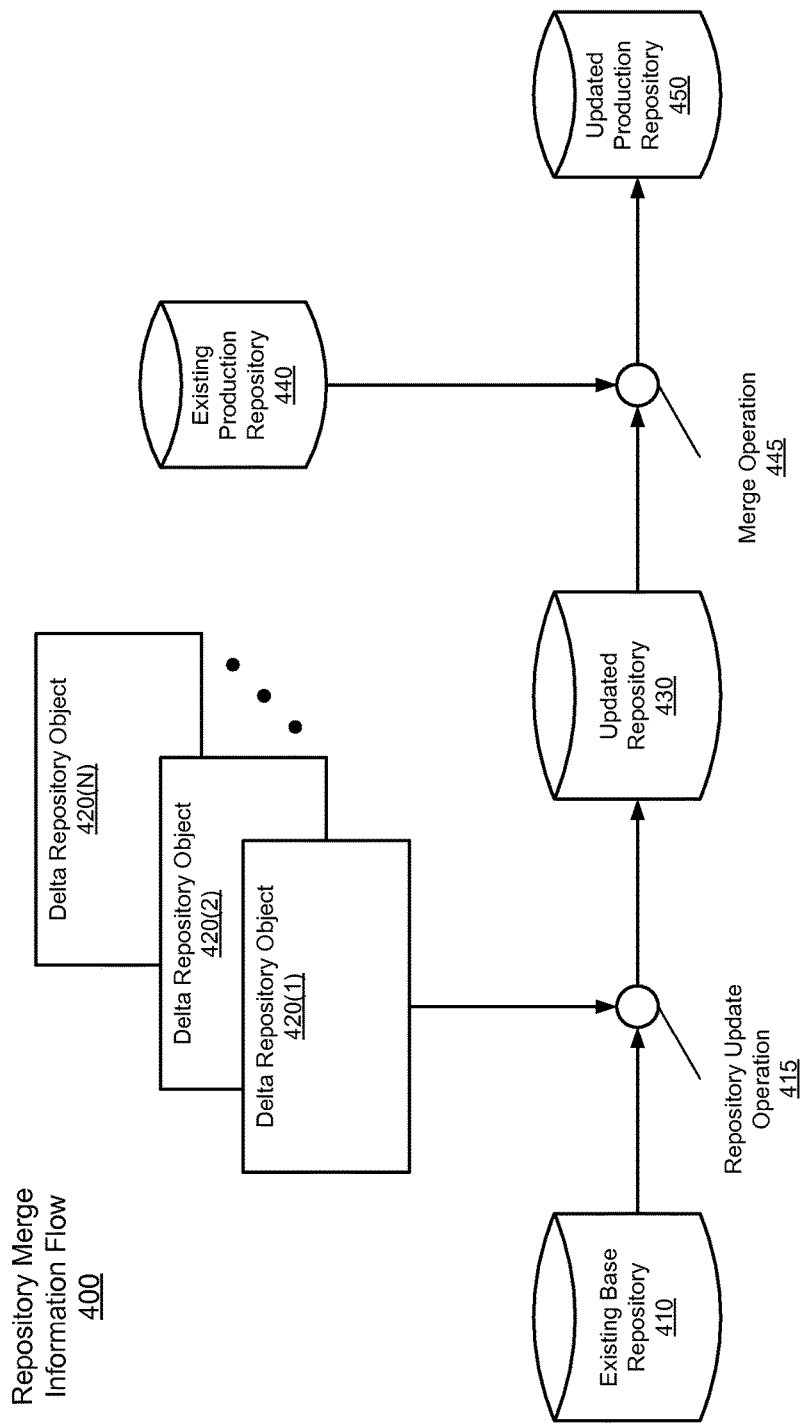
FIG. 4 is a simplified block diagram illustrating an alternative example of a repository merge information flow, according to embodiments of the methods and systems disclosed herein.

FIG. 4 is a simplified block diagram illustrating an alternative example of a repository merge information flow 400, according to embodiments of the methods and systems disclosed herein. In this scenario, repository merge information flow 400 again begins with an existing base repository 410 (a similar fashion to repository merge information flow 200, and its starting point of base repository 210).

Taking existing base repository 410 as its starting point, repository merge information flow 400 includes a repository update operation 415, in which existing base repository 410 is updated by the application of one or more delta repository objects (depicted in FIG. 4 as delta repository objects 420(1)-(N)). The performance of repository update operation 415 results in the generation of an updated repository 430. In turn, updated repository 430 is merged with an existing production repository 440 in a merge operation 445. The performance of merge operation 445 as between updated repository 430 and existing production repository 440, results in an updated production repository 450. While not specifically shown in FIG. 4, it will be appreciated that existing production repository 440 can (and will typically) include modifications made, for example, by the end-user. That being the case, existing production repository 440 can, in fact, be used existing base repository 410 as its starting point, and then modified reflect customizations made thereto by the end-user, third-parties, and other such entities.

Repository merge information flow 400 provides an example of a process referred to herein as a delta merge. In certain embodiments, such a delta merge can employ a three-way merge technique that is tailored to upgrading a repository using an IRM-based approach according to embodiments such as those disclosed herein. Such a three-way merge technique detects and resolves conflicts within the repository during the merge operations, reducing the number of conflicts detected after the merge (i.e., post-merge). As will be appreciated in light of the present disclosure, such a three-way merge can be accomplished by making a copy of existing production repository 440, and then applying the changes represented in delta repository objects 420(1)-(N) by merging the objects of delta repository objects 420(1)-(N) into existing production repository 440. Fundamentally, three sources of repository objects (a base repository of some sort, customized repository objects, and delta repository objects) are merged in constructing the resulting production repository (e.g., updated production repository 450). In so doing, an IRM-based technique provides a number of advantages, including a reduction in the number of conflicts encountered and reduced time/resources in performing such operations. For example, the number of conflicts is reduced as a result of the delta file including only the objects modified (though this need not be adhered to strictly (i.e., other objects (modified or not) can be included in such delta files) and the single path of hierarchy employed thereby (and described in detail in connection with FIGS. 8-9 and 12-17).

With regard to the inclusion of one or more otherwise-unchanged objects in a delta file, such as described herein, such inclusion can be accomplished by way of functionality referred to herein as "touching" such objects (either manually or automatically). When touched, a tag record is inserted in the object tag table using the developer's current session tag. For example, suppose that if an object OBJ1 is changed by a tag TAG1, but was referenced by TAG2. In such a scenario, while generating a delta for the tag TAG2, the object OBJ1 will not be included. This may lead to improper behavior of the resulting application. For the correct behavior, TAG2 should also include OBJ1, despite not having been modified thereby. To deal with such scenarios, a "Touch Object" facility can be made available to the user. Using such a facility, a user can include any objects of interest in the delta file(s) thus generated. If the object is not tagged, then such a "Touch Object" facility makes an entry to the tag object table. If the object is already tagged, then such a "Touch Object" facility can simply update the last updated date in the tag object table. By way of further example, there can be assumed a common object (X) between two industry-specific deltas (e.g., industry-specific delta files, which reflect the need for changes specific to a given industry, which can be referred to as COM and TNT, as per later examples) with the same value. COM is already deployed and delta files are currently being deployed for TNT. During merge, object X would be resolved as no conflict (or) no change, and there will be no tag inserted for TNT during merge. In such a case, an "auto-touch" function can be employed to iterate through the objects in the given delta file, and "touch" them in order to create tag entries, thereby ensuring that the objects needed for the given industry are included in the delta file generated (regardless of whether changes were made to the object(s) in question).

Returning now to FIG. 4, when a merge operation of this sort is performed, the operation involves only the objects affected by the delta merge (the inclusion of other objects notwithstanding, as noted), which results in only actual conflicts (those pertaining to the affected objects (referred to herein as delta objects)). This is also true of objects that have been customized (e.g., by an end-user)—only those customized objects affected by the delta merge need be involved therein, as is the case for conflict determinations, as well. As also noted, such an approach results in a reduction of the time and resources required to perform such a merge operation, since only the delta objects are subject thereto (particularly when compared to a "full merge," in which all (or substantially all) objects are subject to merge operations).

Figure 5:
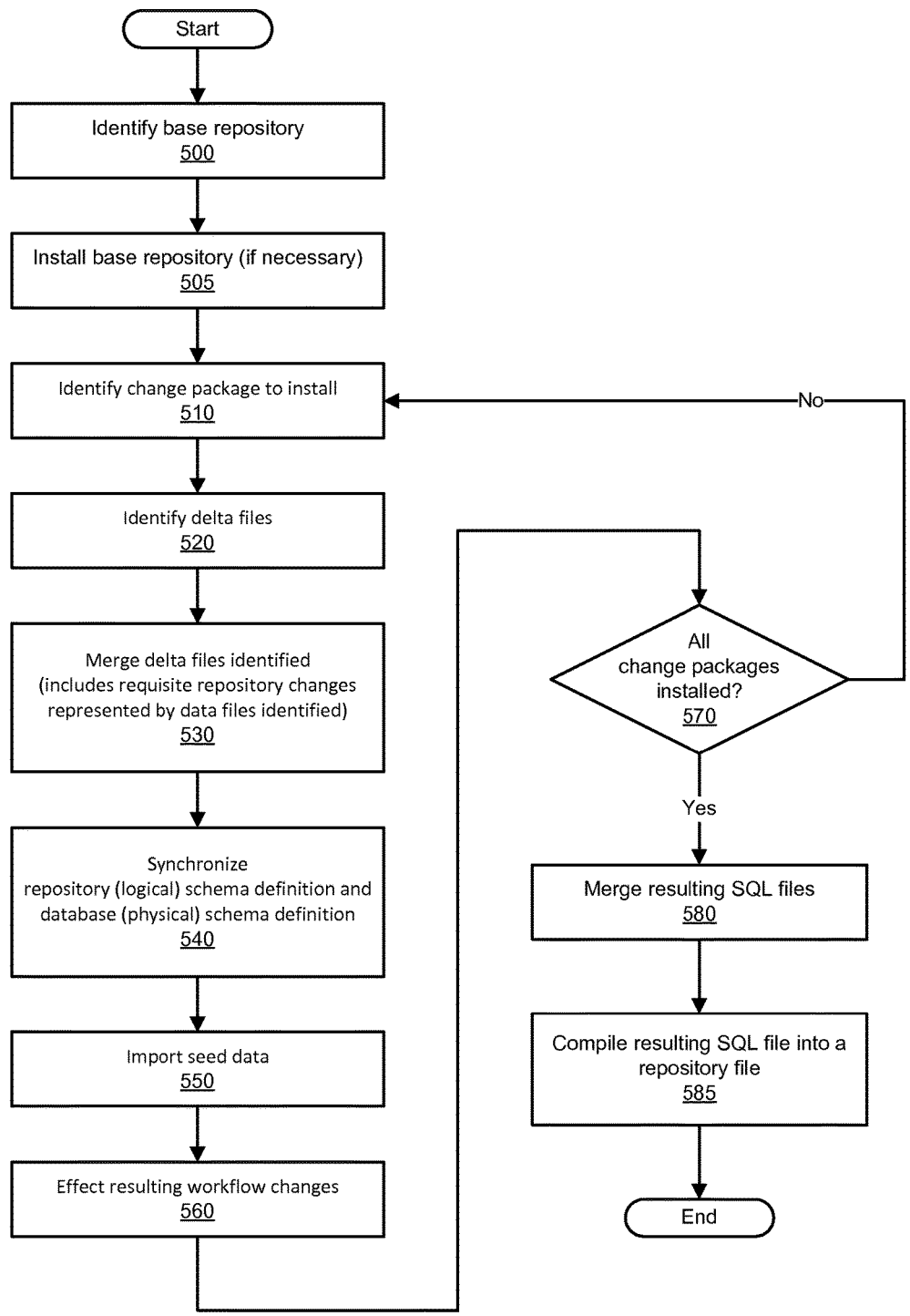
FIG. 5 is a simplified flow diagram illustrating an example of a process of performing an incremental repository merge operation, according to embodiments of the methods and systems disclosed herein.

FIG. 5 is a simplified flow diagram illustrating an example of a process of performing an incremental repository merge operation, according to embodiments of the methods and systems disclosed herein. The process of FIG. 5 begins with the identification of the base repository to be used as the starting point for the incremental repository merge operation (step 500). Once identified, the base repository can be installed, if necessary (step 505). As will be appreciated, the incremental repository merge operation depicted in FIG. 5 can comprehend effecting changes for a single change package, for those represented by multiple change packages. To this end, the change package to be installed is first identified (step 510). Next, the delta file(s) involved in effecting such changes are identified, for example, by identifying one or more merge delta files that include requisite repository changes for data files identified (step 520). The delta file(s) thus identified are merged with the base repository (including requisite repository changes represented by the data files thus identified (step 530). Once the delta file(s) have been merged into the base repository, the repository's schema (the logical schema) definition and the database schema (the physical schema) definition are synchronized (step 540).

Once the repository and database schema have been synchronized, seed data (including, e.g., language-specific seed data) can be imported into the database (step 550). Seed data (more specifically, seed data records) is information (e.g., records) provided in the database tables as part of an update. Seed data provides information that can be used in running an application. Examples of seed data include the values in a list-of-values (LOV) definition, default mappings of views to responsibilities, predefined queries, and the like. Seed data, and the organization thereof, are described in detail in connection with, e.g., FIGS. 13 and 14.

Next, workflow changes resulting from the merge and synchronization operations are then effected (step 560). Such workflow changes can be displayed to a user post-merge, using the facilities described elsewhere herein, using tools that provide for visual comparison of workflows and tasks. Such functionality can be provided, for example, by way of a workflow/task difference utility. By presenting differences between the original workflows/tasks and post-merge workflows/tasks, such a utility simplifies the identification of differences in versions of workflows and tasks. In use, such a utility allows for the selection of two versions of the same process or task (e.g., by selecting an object to examine pre- and post-merge). A graphical representation of the given workflow/task associated therewith, both pre- and post-merge, is thus presented, and in so doing, allows for visual identification of differences therebetween. Further, in certain embodiments, a step in such visual representations can be selected (in either version), and, if the same step exists in the other version being compared, that step in the other version is highlighted. Such a feature is useful for visually complex processes, in which steps have been rearranged.

A determination is then made as to whether the requisite change packages have been installed (step 570). If further change packages remain to be installed, the process loops back to the identification of the next change package to install (step 510). It will be appreciated in light of the present disclosure that, by using an IRM-based approach, the aforementioned operations can be combined into a single set of operations that is amenable to automation (e.g., for execution by a wizard or other such construct). The process continues from this point forward, until returning to the aforementioned determination. Once the requisite change packages have been installed (step 570), the SQL files resulting from these operations are merged (step 580). The resulting merged SQL file is then compiled into a repository file (e.g., including a subset of the tables containing the requisite object definitions) (step 585). The process then concludes.

Figure 6:
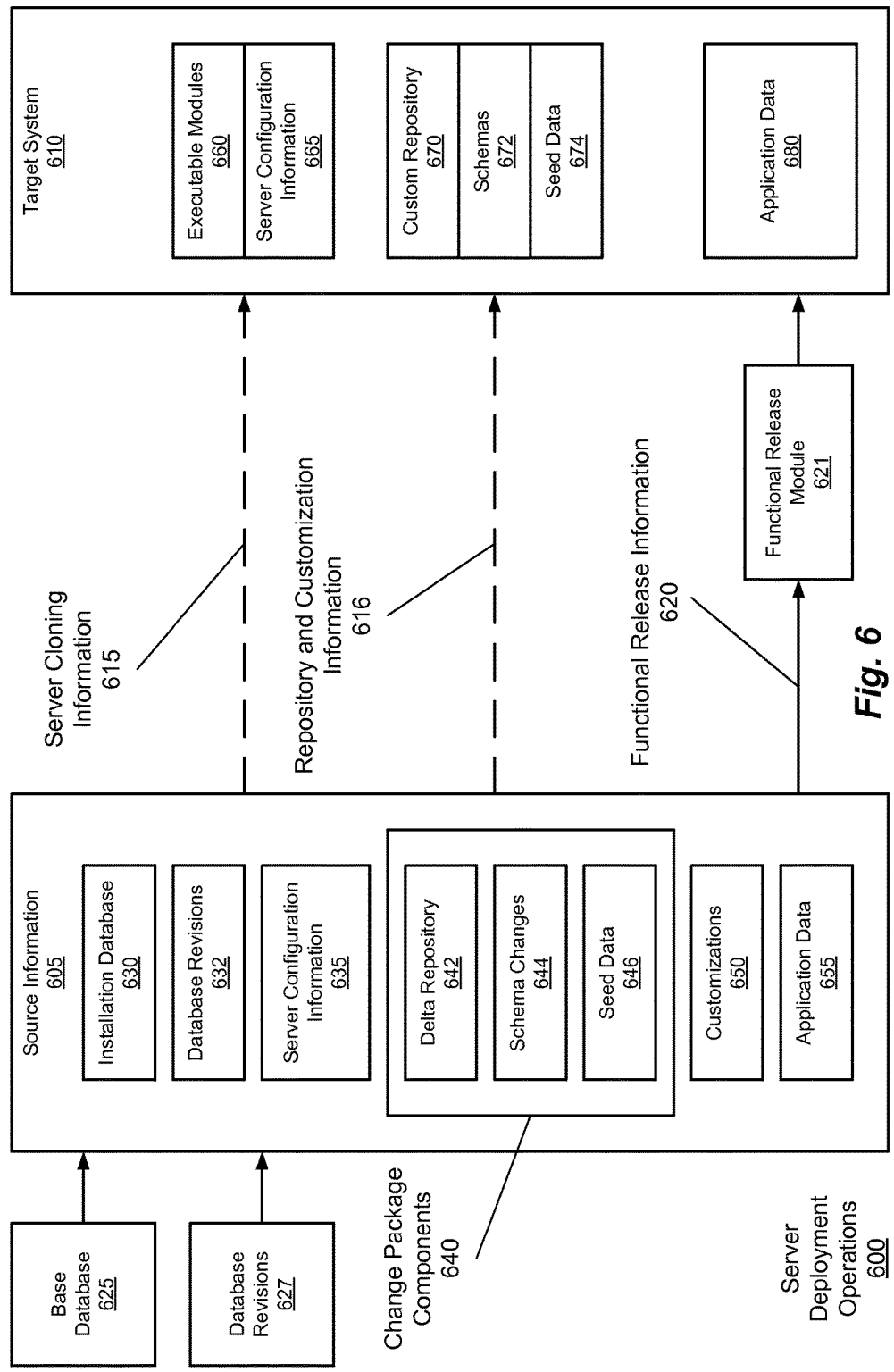
FIG. 6 is a simplified block diagram illustrating an example of server deployment operations, according to embodiments of the methods and systems disclosed herein.

FIG. 6 is a simplified block diagram illustrating an example of server deployment operations, according to embodiments of the methods and systems disclosed herein. Server deployment operations such as those illustrated in FIG. 6 (depicted in FIG. 6 as server deployment operations 600) include operations that support and facilitate the distribution of repositories and databases, updated and modified according to IRM-based techniques (including object tagging) according to the methods and systems disclosed herein. Server deployment operation 600 comprehend operations such as server cloning, patch deployment (e.g., including installation changes and changes to target environments), the deployment of server configuration (e.g., include server configuration changes and the migration of changes to target environments), and the like.

Server deployment operations 600 include operations that allow for the generation of source information (depicted in FIG. 6 as source information 605) which can be distributed to various host systems within an enterprise (e.g., depicted in FIG. 6 as a target system 610). Server deployment operations 600 accomplish such distribution via the promulgation of information such as server cloning information 615 and repository and customization information 616. Further, functional releases of the requisite software and information can be accomplished through the provision of functional release information (depicted in FIG. 6 as functional release information 620), using an enterprise manager or other such tool (depicted in FIG. 6 as a functional release module 621). As is indicated in FIG. 6, server cloning information 615 and repository and customization information 616 can be transferred separately, or as part of functional release information 620 (as indicated by the dashed lines used to represent the transfer of server cloning information 615 and repository and customization information 616 in FIG. 6). In the former case, while server cloning information 615 and repository and customization information 616 would be transferred separately, functional release information 620 could still be transferred (e.g., via functional release module 621), in order to provide any other information needed for the deployment of the server and associated information to target system 610.

The deployment of servers in server deployment operations 600 begins with one or more base databases (depicted in FIG. 6 as a base database 625, and may also include revisions to the base database (depicted in FIG. 6 as database revisions 627). Base database 625 and database revision 627 serve as inputs to the generation of source information 605. Source information 605 includes an installation database 630 (based, for example, on base database 625) and database revisions 632 (based, for example, on database revisions 627). Also included in source information 605 is server configuration information 635, which includes information regarding the configuration of the servers to be executed on the given target systems (e.g., target system 610). Also included in source information 605 are change package components 640 which provide for updates and modifications to the repositories associated with installation database 630 (and, potentially, database revisions 632).

As described elsewhere herein (e.g., in connection with FIGS. 1-5), change package component 640 include one or more delta repositories (depicted in FIG. 6 as a delta repository 642), one or more schema changes (depicted in FIG. 6 as schema changes 644), and seed data (depicted in FIG. 6 as seed data 646). Source information 605 also includes customizations to the databases and schemas in question (and are depicted in FIG. 6 as customizations 650). Also distributed as part of server deployment operations 600 is application data 655 (e.g., data created by the organization in which the deployment is taking place, which is to be manipulated and maintained via the server(s) being deployed).

Server deployment operations 600 include the promulgation of source information 605 to various target systems, such as target system 610, via the distribution of server cloning information 615, repository and customization information 616, and functional release information 620. In so doing, server deployment operations 600 result in the transfer of server cloning information 615, repository and customization information 616, and function release information 620 to, for example, target system 610. Target system 610 thus stores a variety of executable modules and associated information. This includes executable modules 660 and server configuration information 665. Target system 610 also receives one or more custom repositories (depicted in FIG. 6 as a custom repository 670), as well as one or more associated schemas (depicted in FIG. 6 as schemas 672) and seed data (depicted in FIG. 6 as seed data 674). In order for target system 610 to support the requisite applications, target system 610 also receives application data 680.

Figure 7:
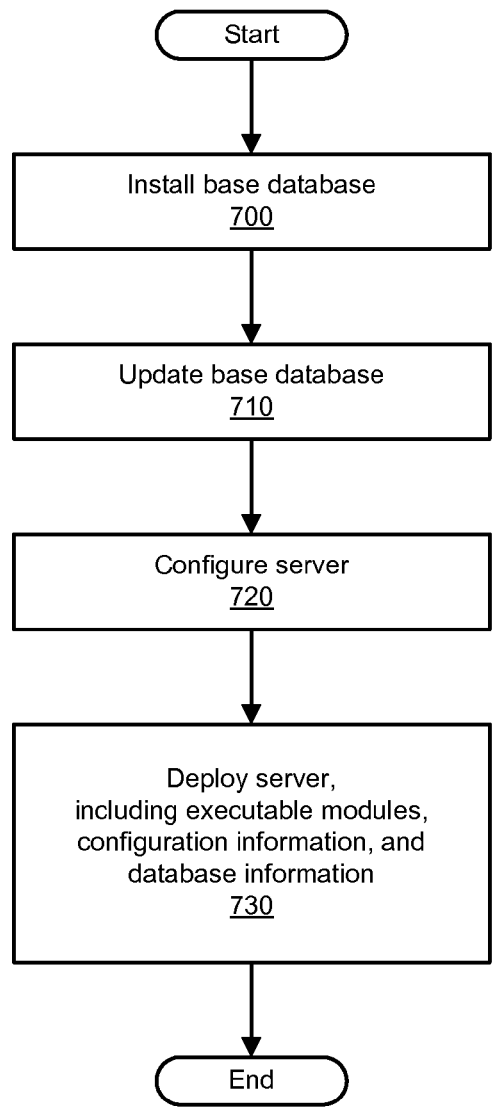
FIG. 7 is a simplified flow diagram illustrating an example of a process of performing server deployment operations, according to embodiments of the methods and systems disclosed herein.

FIG. 7 is a simplified flow diagram illustrating an example of a process of performing server deployment operations, according to embodiments of the methods and systems disclosed herein. The process depicted in FIG. 7 reflects one alternative for a process that effects server deployment operations 600. The process of FIG. 7 begins with the installation of the base database (step 700). Next, the base database is updated (step 710). Once the database has been configured thusly, the server to be deployed is configured (step 720). The database and server to be deployed being properly configured, operations are performed to deploy the server (step 730). These operations include the distribution of executable modules, configuration information, and database information. The database and configuration information can include information such as customizations, schemas, seed data, and other information as may be needed to deploy the server to the desired target systems.

Using a process such as that depicted in FIG. 7, server deployment according to the methods and system described herein includes the provision of installation and patching information (thus providing for software/patch deployment), as well as server configuration information (thus providing for server configuration deployment). Such installation and patching information can include, for example, information regarding installation and patching information for one or more gateways, the server in question, and, if needed, any web server extensions (which, e.g., enable communication between one or more web clients and the server deployed), among other such items. Target systems thus receive, for example, software binaries, patch binaries, and server configuration information. By using such an approach, an organization can enjoy simpler and easier installation and patching of server software, as well as simpler and easier server configuration and provisioning.

Figure 8:
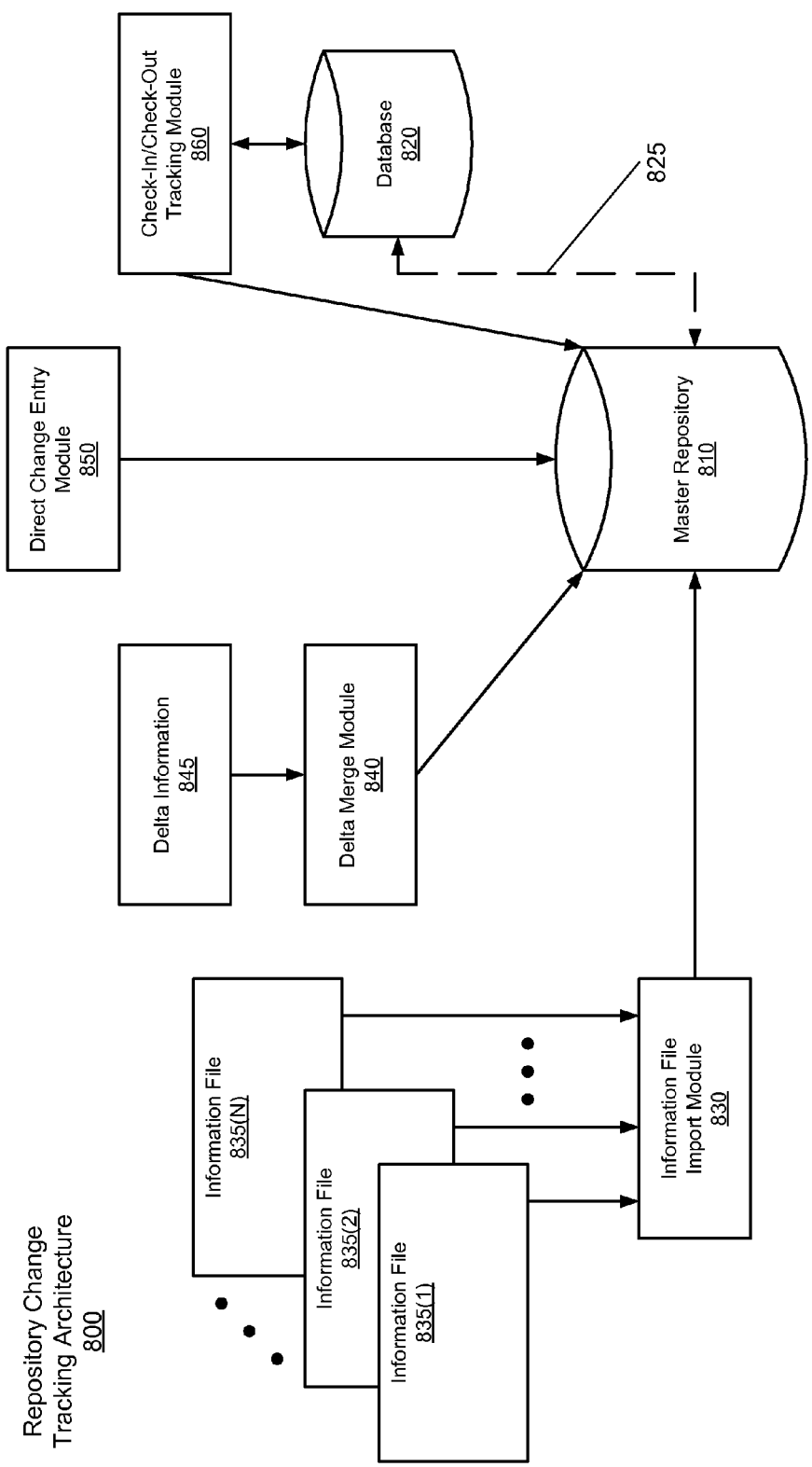
FIG. 8 is a simplified block diagram illustrating an example of a repository change tracking architecture, according to embodiments of the methods and systems disclosed herein.

FIG. 8 is a simplified block diagram illustrating an example of a repository change tracking architecture 800, according to embodiments of the methods and systems disclosed herein. As illustrated in FIG. 8, repository change tracking architecture 800 is directed to the proper maintenance of information in a master repository 810. Master repository 810, in comparable fashion to the repositories as described elsewhere herein, provides a logical organization for data stored in an associated database (depicted in FIG. 8 by a database 820), a relationship depicted in FIG. 8 by a relationship 825. Repository change tracking architecture 800 maintains objects, object components, schemas, and other such information in master repository 810, in an accurate and up-to-date fashion. To this end, repository change tracking architecture 800 includes an information file import module 830, which facilitates importing information files such as information files 835(1)-(N). Information files 835(1)-(N) include information regarding entire objects (as well as the associated object components) for the objects being imported into master repository 810 by information file import module 830, and can be implemented as update files such as those described elsewhere herein.

In a similar fashion, a delta merge module 840 is tasked with merging delta information 845 into master repository 810. As will be appreciated in light of the present disclosure, information files 835(1)-(N) include information relevant to the objects being imported into master repository 810, and can be implemented as delta files such as those described elsewhere herein. While this aspect of the operations of information file import module 830 and the information files thus imported (information files 835(1)-(N)) provide for the importation of entire objects into master repository 810, updates and modifications to such objects do not necessitate the complete replacement of objects thus updated and modified. In this regard, then, delta merge module 840, by merging delta information such as delta information 845, into master repository 810 provides for an effective and efficient avenue for updating and modifying the objects (and schemas and the like) in master repository 810 in an efficient and effective manner Such efficiencies are achieved through the implementation of selective portions of those objects being replaced as part of the merge operations performed by delta merge module 840. An example of such selective replacement and revision is given in connection with the description of FIG. 9 below. The information in master repository 810 can also be changed directly by, for example, an end-user through the use of a direct change entry module 850. In comparable fashion, a check-in/check-out tracking module 860 can be employed to allow, for example, and end-user to check out various ones of the objects maintained in master repository 810 (and thus the access to database 820), make changes to those objects, and check the modified objects back into master repository 810.

Using a repository change tracking architecture such as repository change tracking architecture 800, a determination can be made as to the handling of changes from a variety of sources, including changes made by developers and other users. This objective is facilitated through the implementation of repository object tagging. As shown in FIG. 8, a user can make changes to/update a repository in a number of ways. For example, a user can insert objects and make modifications to existing objects directly, using the tools provided in the repository change tracking architecture (e.g., direct change entry module 850). Tagging can thus occur when a user inserts a new record or modifies an existing record using such tools. Another source of changes, as noted, is the importation of information files (e.g., information files 835(1)-(N)) into the given repository (e.g., master repository 810). Object check-in/check-out is also tracked in repository change tracking architecture 800 (e.g., through the use of object tags). In such cases, a source control mechanism (not shown) identifies repository objects modified by a developer or other user, when objects are checked out/in, and tracks the occurrence of such action. In such situations, one of the goals of tracking such repository changes is to capture the changes made to a given object during a check-in/check-out session. Various scenarios in this regard are discussed subsequently, in connection with FIGS. 18A-18E.

Figure 9:
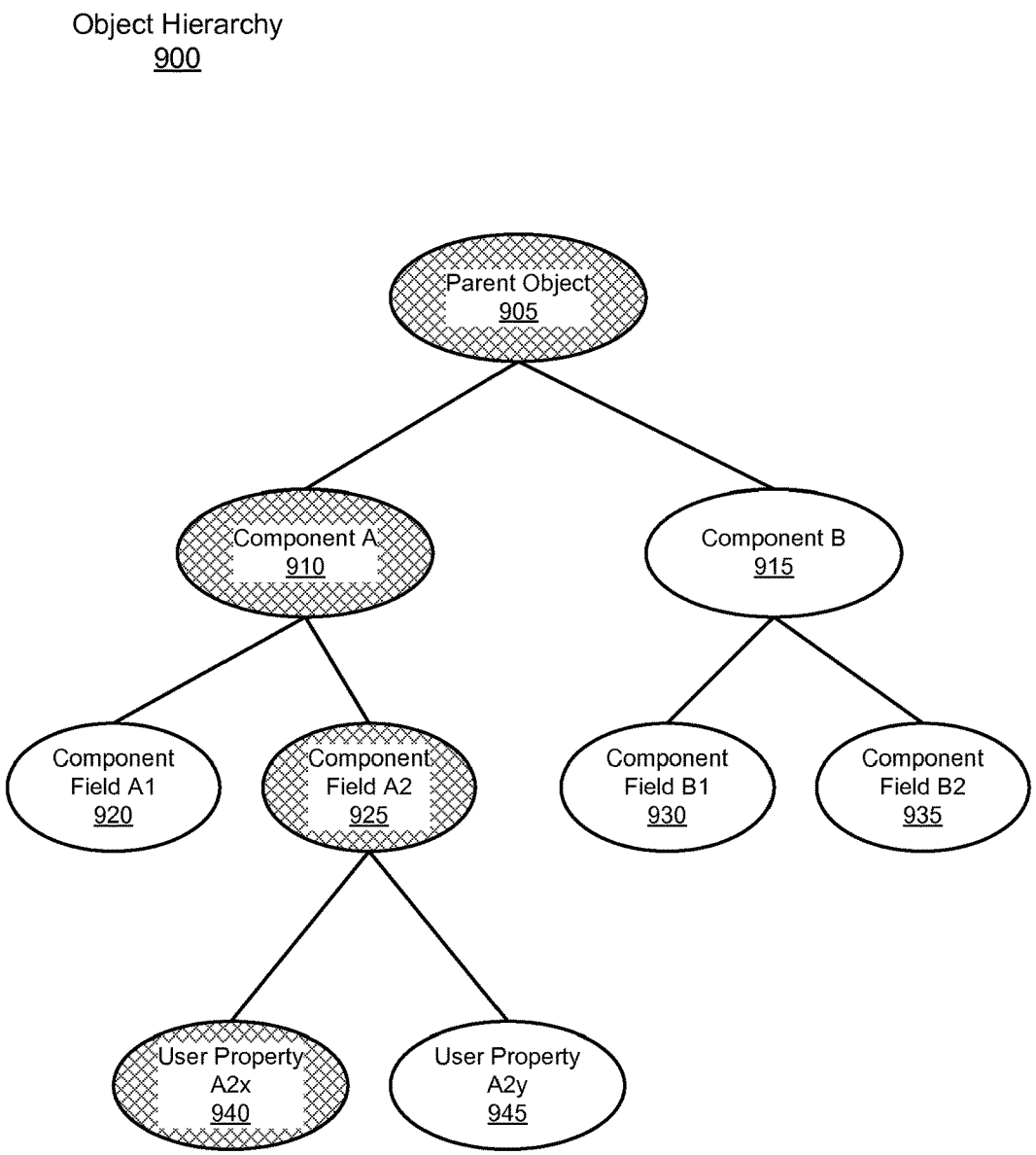
FIG. 9 is a simplified block diagram illustrating an example of an object hierarchy illustrating a single path hierarchy for the generation of delta files, according to embodiments of the methods and systems disclosed herein.

FIG. 9 is a simplified block diagram illustrating an example of an object hierarchy illustrating a single path hierarchy for the generation of delta files, according to embodiments of the methods and systems disclosed herein. As noted with regard to the discussion of FIG. 8, delta information 845 can be merged into a master repository such as master repository 810 by delta merge module 840 or comparable functionality. In so doing, efficient and effective use of resources is provided as a result of only needing to access a portion of any given object.

FIG. 9 illustrates an object hierarchy of such an object, with one of its elements having been changed, and, via object tagging, a single path hierarchy being generated for use in a delta file (as represented by delta information 845). Thus, an object hierarchy 900 is depicted as including a parent object 905, which has associated with it two object components, a component A 910 and a component B 915. In turn, component A 910 has associated with it a component field A1 920 and a component field A2 925. In comparable fashion, component B 915 has associated with it a component field B1 930 and a component field B2 935. Component field A2 925 has associated with it a user property A2x and a user property A2y 945. As will be appreciated in light of the present disclosure, object hierarchy 900 illustrates a single path hierarchy that can be used in the generation of delta files, as is now described.

In the case of objects imported into a master repository (e.g., master repository 810), information files 835(1)-(N) are configured such that, as noted, the entire object is included in those files, and is subsequently imported into the master repository. In the case of the object hierarchy depicted in FIG. 9, this entails the inclusion of the entire object hierarchy in the given information file. By contrast, a delta file such as that represented by delta information 845, include only the location of the element thus changed in the given object hierarchy, and information regarding the change to that element. Thus, as depicted in FIG. 9, only information regarding the cross-hatched elements (those being parent object 905, component A 910, component field A2 925, and user property A2x 940), as well as the changes to the affected element (in the case of the object hierarchy depicted in FIG. 9, the changes to user property Ax 940). Thus, while an information file can be designed such that the archive contains the full object definition for the relevant objects and components (including all sibling objects and components), a delta file can be designed to contain only the changes in single path hierarchy necessary to identity where the changes belong in an object. For instance, if a field user property is changed, simply including that information is insufficient for the changes to be accurately placed in the object. Instead, the fields that the user property modifies are needed, and thus such information would also be included. As will also be apparent, in light of the present specification, not only does such an approach improve the efficiency of such operations, but also results in delta files being significantly smaller in storage size than a corresponding delta file. Such a delta file can be generated using techniques such as point-in-time tagging (e.g., date/time information), development tagging, and the like, as well as combinations thereof. The generation and use of delta files are discussed throughout the present disclosure, and are described in further detail, for example, in connection with FIGS. 15-17.

Figure 10A:
FIGS. 10A, 10B, and 10C are simplified block diagrams illustrating examples of various table layouts that can be used in object tagging, according to embodiments of the methods and systems disclosed herein.
Figure 10B:
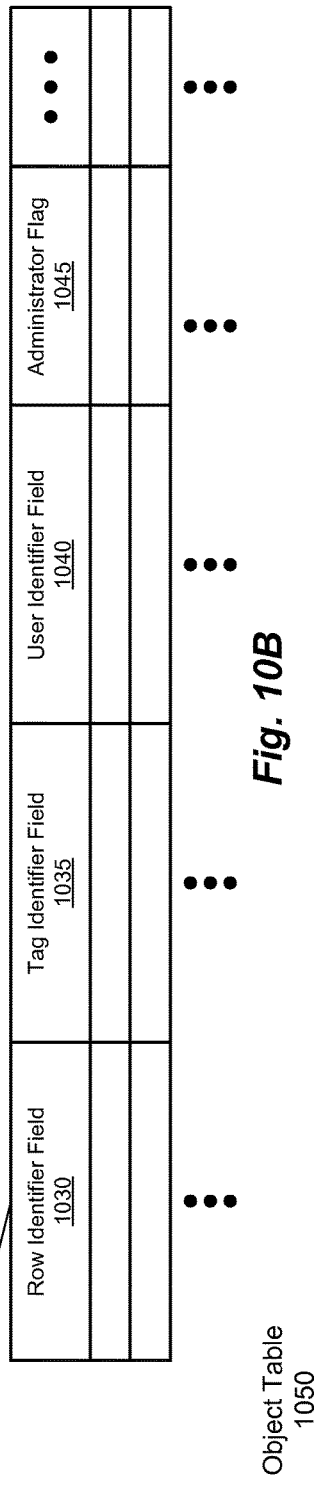
Figure 10C:
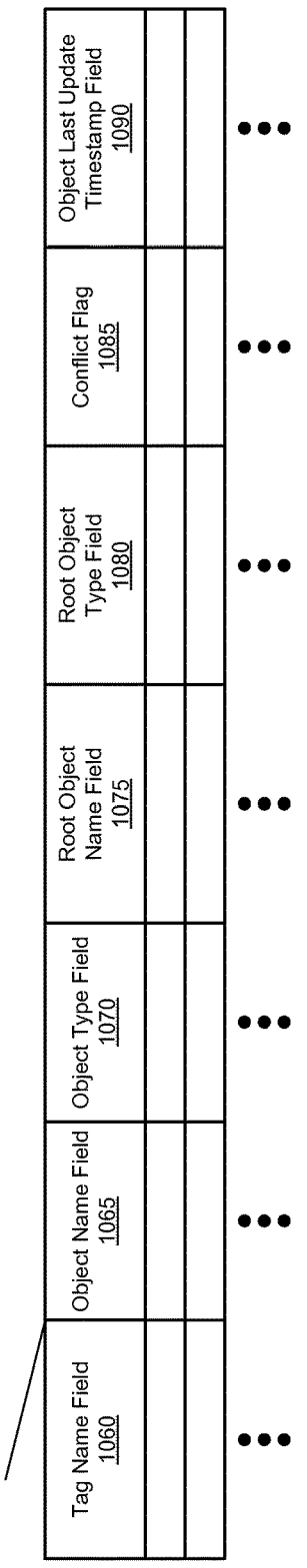

FIGS. 10A, 10B, and 10C are simplified block diagrams illustrating examples of various table layouts that can be used in object tagging, according to embodiments of the methods and systems disclosed herein. A tag is a construct that, for example, acts to assign a name to a given feature/team (designating one or more users as being associated with such categories). Object tagging is a technique that associates such 'tags' with 'objects' that have been changed during a development process. In one embodiment, a user is associated with one or more tag(s). Any modification made to repository objects is tracked using the tag selected. As will be appreciated in light of the present disclosure, however, such object tagging techniques, while discussed in terms of tracking changes to repository objects, can, in fact, be used with respect to any environment in which tracking changes made to one or more objects is useful. In the present case, tables (a tag table, a tag user table, and a tag object table) are provided to facilitate tracking of changes to repository objects in the noted manner.

FIG. 10A illustrates a tag table 1000 and the fields which make up tag table 1000. The fields of tag table 1000 include a row identifier field 1005, a name field 1010, and a description field 1015, among other possible fields that might be used to maintain a list of possible tag names. By maintaining a tab table such as tag table 1000, a repository change tracking architecture such as repository change tracking architecture 800 is able to maintain a list of tags identified by both their respective row identifier and name, as well as a description as to the type of change that the tag represents, and other relevant information. In this manner, a repository change tracking architecture can identify a given tag using its row identifier, and then tag the affected object using the tag's name. A tag table organized in the manner of tag table 1000 thus includes a list of unique tag-names or module names corresponding to application module or industry for which the changes are to be tracked.

FIG. 10B illustrates an example of a user table (depicted in FIG. 10B as user table 1020). User table 1020 supports operations related to the tagging of objects based on the identity (or one of a number of identities) of a user. To this end, user table 1020 includes a row identifier field 1030, a tag identifier field 1035, a user identifier field 1040, and an administrator flag 1045, among other fields that might be used in the identification of users when tagging objects. As before, an identifier stored in row identifier field 1030 is used to identify information regarding a given user. In so doing, the entries of user table 1020 serve to associate a user with a given tag. Each user is associated with one or more tag(s). In using tools such as those depicted in FIG. 8, a user is associated with the appropriate tag(s) upon launching such tools. Such association can be performed automatically upon launch of one or more of the tools, or, in the case in which a user is associate with more than one tag (e.g., a scenario in which the user's user identifier is associated with one or more tag), the user can be offered the option of selecting from among the tags thus associated, during the launch of the given tool. User table 1020 thus supports the association of a given user identifier (stored in user identifier field 1040) and one or more tag identifiers (stored in tab identifier field 1035). Alternatively, user table 1020 can be constructed such that a given user identifier is associated with multiple tag identifiers and in so doing, allow a user to maintain membership in multiple groups (each of which would be associated with one of the aforementioned tag identifiers), for example. Administrator flag 1045 maintains information with regard to whether the given user is an administrator. As an administrative user, the user is presented with, for example, all available tags as listed, for example, tag table 1000. Thus, an administrator can be permitted access to, and management of the tagging process for all users (or a subset thereof). With object tagging enabled, an administrator can perform various tasks, such as create tags and assign the tags to developers, and view objects that have been updated or that have developer conflicts (e.g., where two developers have modified the same object).

As depicted in FIG. 10C, the construction and layout of an object table 1050 is illustrated, and presents examples of information that can be stored therein. In the example depicted in FIG. 10C, object table 1050 includes a tag name field 1060, object name field 1065, an object type field 1070, a root object name field 1075, a root object type field 1080, a conflict flag 1085, and an object last update timestamp field 1090. In an embodiment of the methods and systems described herein, each object that has undergone a change (e.g., having been inserted, updated, and/or modified) has an entry in object table 1050, each record of which uniquely describes the object affected. For example, each record can uniquely describe an object of a particular type which has been changed (using one of the tools depicted in FIG. 8, for example), and maintain such information on a tag-by-tag basis. In certain embodiments, this means that a given combination of a tag name (as stored in tag name field 1060), an object name (as stored in object name field 1065), and an object type (as stored in object type filed 1070) can be used to uniquely identify a given record in object table 1050, and if the object is already present for that tag user, then only the timestamp information in object last update timestamp field 1090 need be updated.

In view of the foregoing, the fields of object table 1050 can, in this example, be interpreted as maintaining information regarding the following attributes:

Tag name—name of the tag of the user who changed the object

Object name—name path of an object formed by appending parent and grandparent names until the root object is reached Object type—type name of the object changed Root object name—name of the root object Root object type—type name of the root object Conflict flag—indicates if an object has been modified by more than one tag (e.g., by users registered under different tags)

Object last update timestamp—shows the timestamp, indicating that time at which the object was modified As will be appreciated in light of the present disclosure, approaches to tagging such as those described herein provide the opportunity to automate many of the operations performed, such as recording timestamp information during the process of importing delta repository objects. During the merge operation, the merge engine can, for example, select only those repository objects that were modified after a given time, based on the timestamps associated with changes to those objects. Hence, fewer objects need to be qualified for a given update, particularly as compared to an update using the full retinue of objects, resulting in a significant reduction in the time needed to perform the update, as well as the computing resources involved.

FIG. 11 is a simplified block diagram illustrating examples of tagging schema, according to embodiments of the methods and systems disclosed herein. FIG. 11 illustrates examples of schema that correspond loosely to the tables depicted in FIGS. 10A, 10B, and 10C (depicted in FIG. 11 as tagging schema 1100). Tagging schema 1100 include a user schema 1110, a user tag schema 1120, a tag schema 1130, and an object tag schema 1140. As can be seen in FIG. 11, in the case in which a user (e.g., an employee User 1) making changes to elements of an order object (e.g., the order object listed in objects tag schema 1140) tagging such changes and arrived at by following the information in tagging schema 1100. In the posited example, a user (e.g., User1) makes a change to a user property field related to the list price that is a component of an order object. That being the case, a record is created to tag the object thus modified by noting that the identifier for the user in question (User1) is U1 (as reflected by user schema 1110). For a user with userId U1, a tag identifier can be arrived at using user tag schema 1120. In this case, a user identifier of U1 is associated with a tag identifier of 1. In turn, a tag identifier of 1 can be used to identify the name of the group to which User 1 belongs, in this case group CMU (as reflected in tag schema 1130). As a result, the entry in order tag schema 1140 related to order-listprice-FUP1 is tagged with the tag name CMU. Other information (e.g., object type of field user property, and object updated to date/time) can also be updated to reflect the change.

Figure 12:
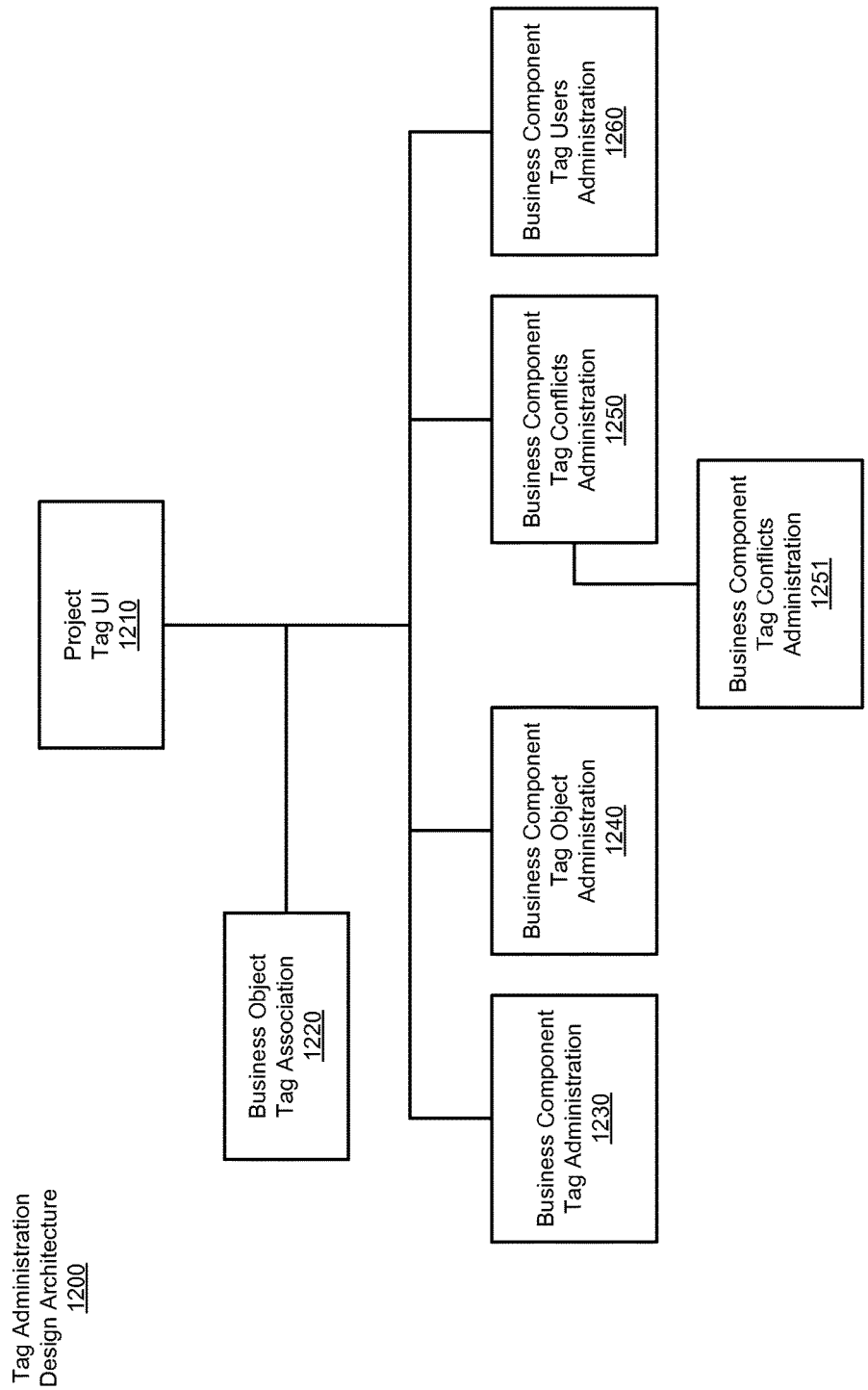
FIG. 12 is a simplified block diagram illustrating an example of a tag administration design architecture, according to embodiments of the methods and systems disclosed herein.

FIG. 12 is a simplified block diagram illustrating an example of a tag administration design architecture, according to embodiments of the methods and systems disclosed herein. The tag administration design architecture depicted in FIG. 12 (tag administration design architecture 1200), represents an architecture for administering object tagging, and reflects the relationships between the various repository objects (including business objects/business components) depicted therein. Tag administration design architecture 1200 provides a project tag user interface 1210 which provides a variety of views into the object tagging process and control over that process. Via project tag user interface 1210, a user (e.g., an administration) can access and manage information such as business object tag association 1220, business component tag administration 1230, business component tag object administration 1240, some number of business component tag conflicts (represented in FIG. 12 by business tag conflicts administration 1250 and business component tag conflicts administration 1251), business component tag users administration 1260, and other such administrative functions. Also, via project tag user interface 1210, an administrator can review a list of tags, sorted by a variety of criteria, including a listing of all object associated with each tag, any conflict records associated with each tag, the users added to each tag, and other such administrative information. Based on the structure provided by tag administration design architecture 1200, a user interface screen for tag administration can provide a wide variety of views, including a list of tags in use (or available for use), as well as a listing of the objects associated with each tag, the conflict records associated with each tag, a listing of the users added to/associated with each tag, and the like, in addition to listing/presenting other useful information.

Figure 13:
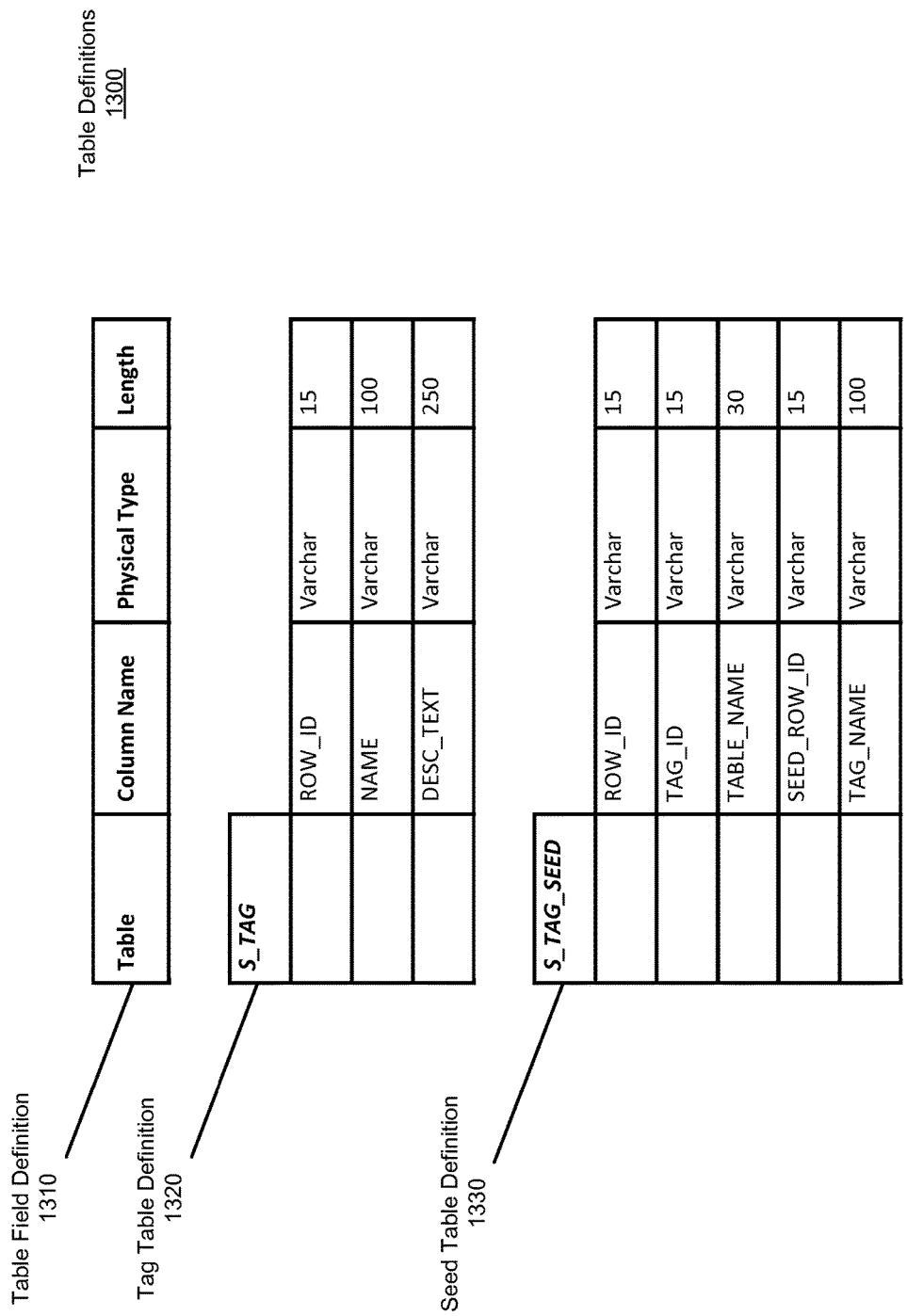
FIG. 13 is a simplified block diagram illustrating an example of table definitions, according to embodiments of the methods and systems disclosed herein.

FIG. 13 is a simplified block diagram illustrating an example of table definitions, according to embodiments of the methods and systems disclosed herein. The table definitions illustrated in FIG. 13 provide definitions for a tag table and a seed table, and are referred to in FIG. 13 as table definitions 1300. Table definitions 1300 define the tables and fields within those tables. To that end, the fields within the tables depicted in FIG. 13 are presented as table field definition 1310. Table field definition 1310 include the name of the table, the name of the column within the table, information regarding the physical type of field and the length of that field. As noted, table definitions 1300 include a tag table definition (depicted in FIG. 13 as a tag table definition 1320) and a seed table definition (depicted in FIG. 13 as a seed table definition 1330).

As before, the columns of the corresponding tag table (e.g., tag table 1000 of FIG. 10A, for example) are defined in tag table definition 1320, which indicates that such a tag table includes a row identifier of type varchar of length 15, a name field of type varchar of length 100, and a description field of type varchar of length 250. Similarly, seed table definition 1330 defines seed data for a tag table, and thus provides for a row identifier field of type varchar of length 15, a tag identifier field of type varchar of length 15, a table name field of type varchar of length 30, a seed row identifier of type varchar of length 15, and a tag name of type varchar of length 100. Information in a seed table defined, for example, by seed table definition 1330 can be used in seeding tag designs by facilitating, for object tagging of new/modified objects, a master table for the list of tags (e.g., as defined by an administrator). Such a seed table can contain, for example, a list of tags representing applications and the row identifier for the developer (user) in the user table (e.g., user table 1020 of FIG. 10B) developing the given application in the current change package, manufacturer release, or other such package. Such a seed table will have a record added for every seed record or modified by the developer, and thus store the associated tag identifier, table name, and row identifier of the modified seed record therein. The relationships and information in such tables are described in further detail with regard to FIG. 14.

Figure 14:
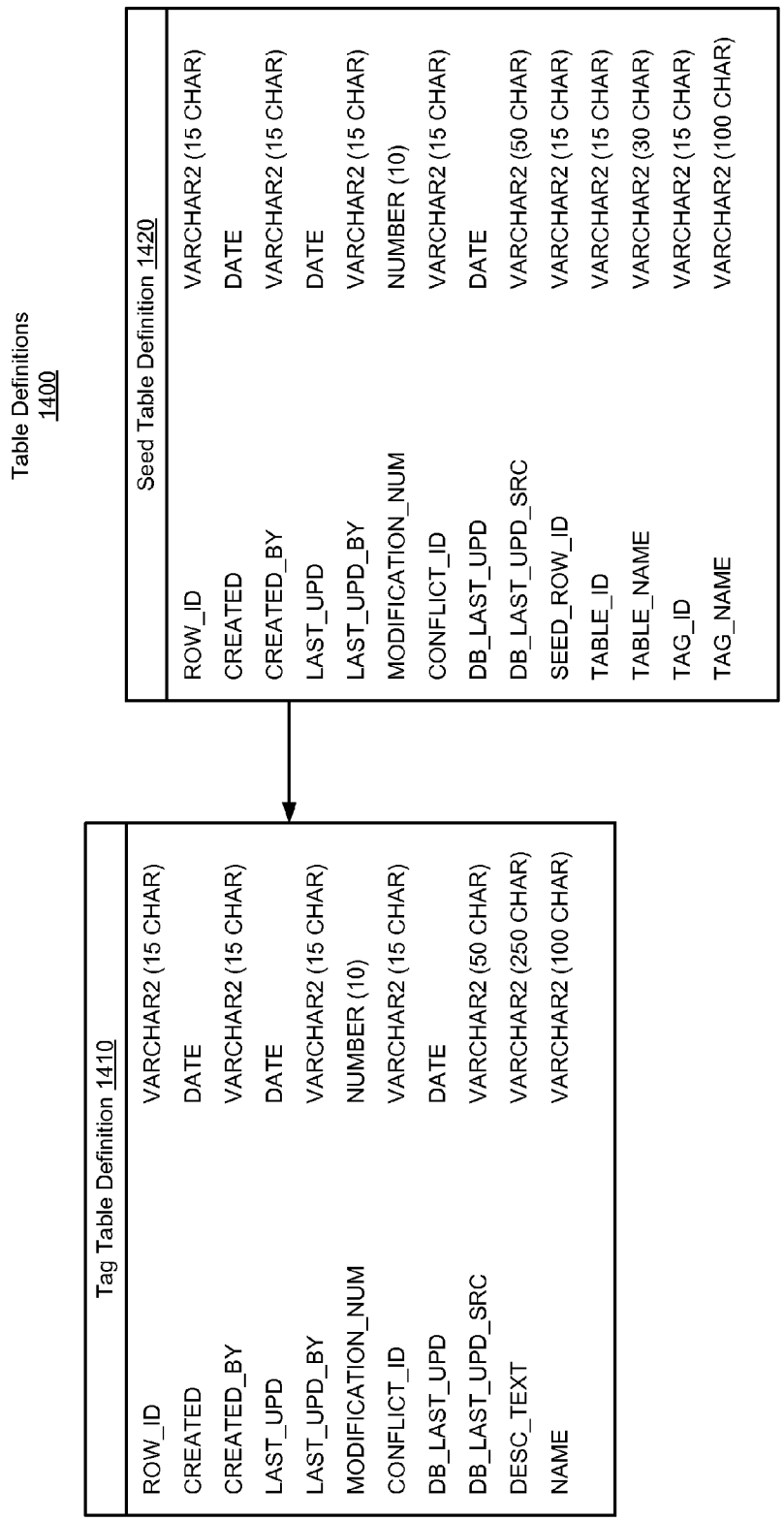
FIG. 14 is a simplified block diagram illustrating another example of table definitions, according to embodiments of the methods and systems disclosed herein.
Figure 15:
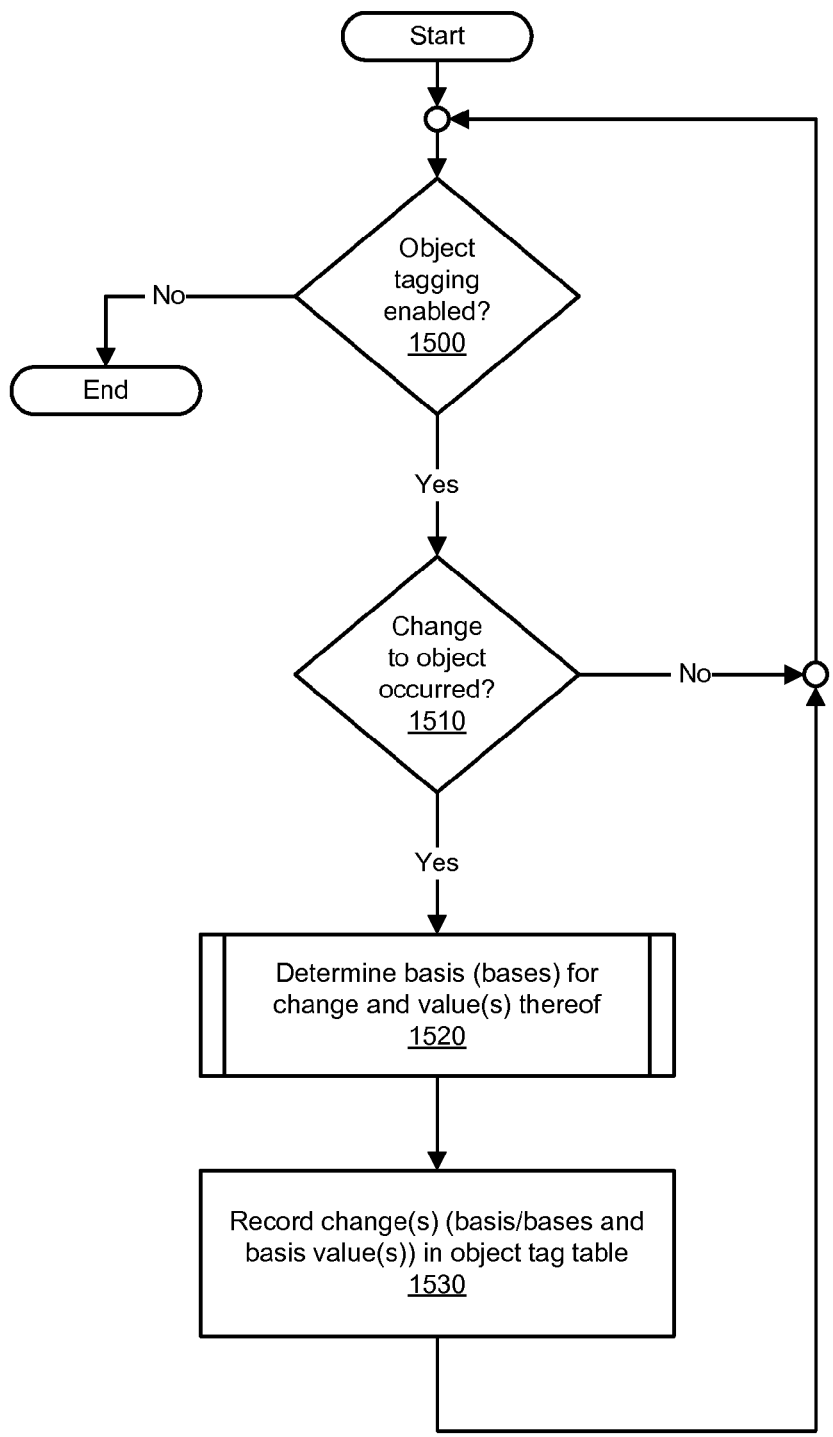
FIG. 15 is a simplified flow diagram illustrating an example of a process of detecting and recording changes to objects, according to embodiments of the methods and systems disclosed herein.

FIG. 14 is a simplified block diagram illustrating another example of table definitions, according to embodiments of the methods and systems disclosed herein. FIG. 14 illustrates tables corresponding to tag table definition 1320 and seed table definition 1330. FIG. 14 depicts table definitions 1400, which include a tag table definition 1410 and a seed table definition 1420. A tag table according to tag table definition 1410 includes:

ROW_ID—Identifier of tag's record row
CREATED—The date the tag's record was created
CREATED_BY—The identity of tag record's creator (administrator, typically)
LAST_UPD—The date the tag's record was last updated
LAST_UPD_BY—The identity of the user who performed the last update
MODIFICATION_NUM—The sequence number of the last modification
CONFLICT_ID—Identifies any conflict that may have occurred
DB_LAST_UPD—The date of the last update to the database
DB_LAST_UPD_SRC—The source of the last update to the database
DESC_TEXT—Description relevant to the tag (e.g., describing the group, a user, circumstances regarding the tag's creation, and so on)
NAME—The tag's name A seed table according to seed table definition 1420 associates a seed record change for a given tag with that tag. Some amount of data is typically released with product updates, for example, which may be required for the application to function (or at least, function sufficiently for the product to be initialized). Such data can be provided in the form of what is referred to herein as seed records, which can be used, and then released, by the application. A seed table according to seed table definition 1420 tracks changes made to seed data for a given tag for a given user, by way of associating a seed record change for a given tag therewith. Some data is typically released, which may be required for the application to function. Thus, in a manner similar to tag table definition 1410, seed table definition 1420 includes:

ROW_ID—Identifier of seed record's row
CREATED—The date the seed record was created
CREATED_BY—The identity of seed record's creator (administrator, typically)
LAST_UPD—The date the seed record was last updated
LAST_UPD_BY—The identity of the user who performed the last update
MODIFICATION_NUM—The sequence number of the last modification
CONFLICT_ID—Identifies any conflict that may have occurred
DB_LAST_UPD—The date of the last update to the database
DB_LAST_UPD_SRC—The source of the last update to the database
DESC_TEXT—Description relevant to the seed record (e.g., describing the group, a user, circumstances regarding the tag's creation, and so on)
SEED_ROW_ID—Row identifier for the seed record in question
TABLE_ID—Table identifier that identifies the table to which the seed record applies
TABLE_NAME—Table name of the table to which the seed record applies
TAG_ID—Identifier for the tag associated with the seed record
TAG_NAME—The tag name associated with the seed record FIG. 15 is a simplified flow diagram illustrating an example of a process of detecting and recording changes to objects, according to embodiments of the methods and systems disclosed herein. The process of FIG. 15 begins with a determination as to whether object tagging has been enabled (step 1500). Object tagging can be enabled, for example, by an administrator of the system, as reflected, also for example, by administrator flag 1045 in user table 1020 of FIG. 10B (which is, as noted, also used in making a determination as to the tags presented to the user/administrator in question). If object tagging has not been enable (or has been disabled during operation), the process concludes. If object tagging is enabled (step 1500), a determination is then made as to whether a change to an object for which object tagging is enable has occurred (step 1510). If no objects have been changed, the process loops to a determination as to whether object tagging remains enabled (step 1500) and the loop continues until such time as object tagging is disabled.

Alternatively, if a change to an object subject to object tagging has occurred (step 1510), a process of determining the basis (or bases) for the change and the value(s) resulting from such changes (step 1520). The process of making such determinations is described in further detail in connection with FIGS. 16A and 16B, below. Once the aforementioned determinations have been made (step 1520), the information regarding such change(s) is (are) recorded (step 1530), in a manner comparable to the processes described in connection with FIGS. 10 and 11, for example. At this juncture, the process loops to the determination as to whether object tagging remains enabled (step 1500), and continues until such time as object tagging is disabled.

Figure 16A:
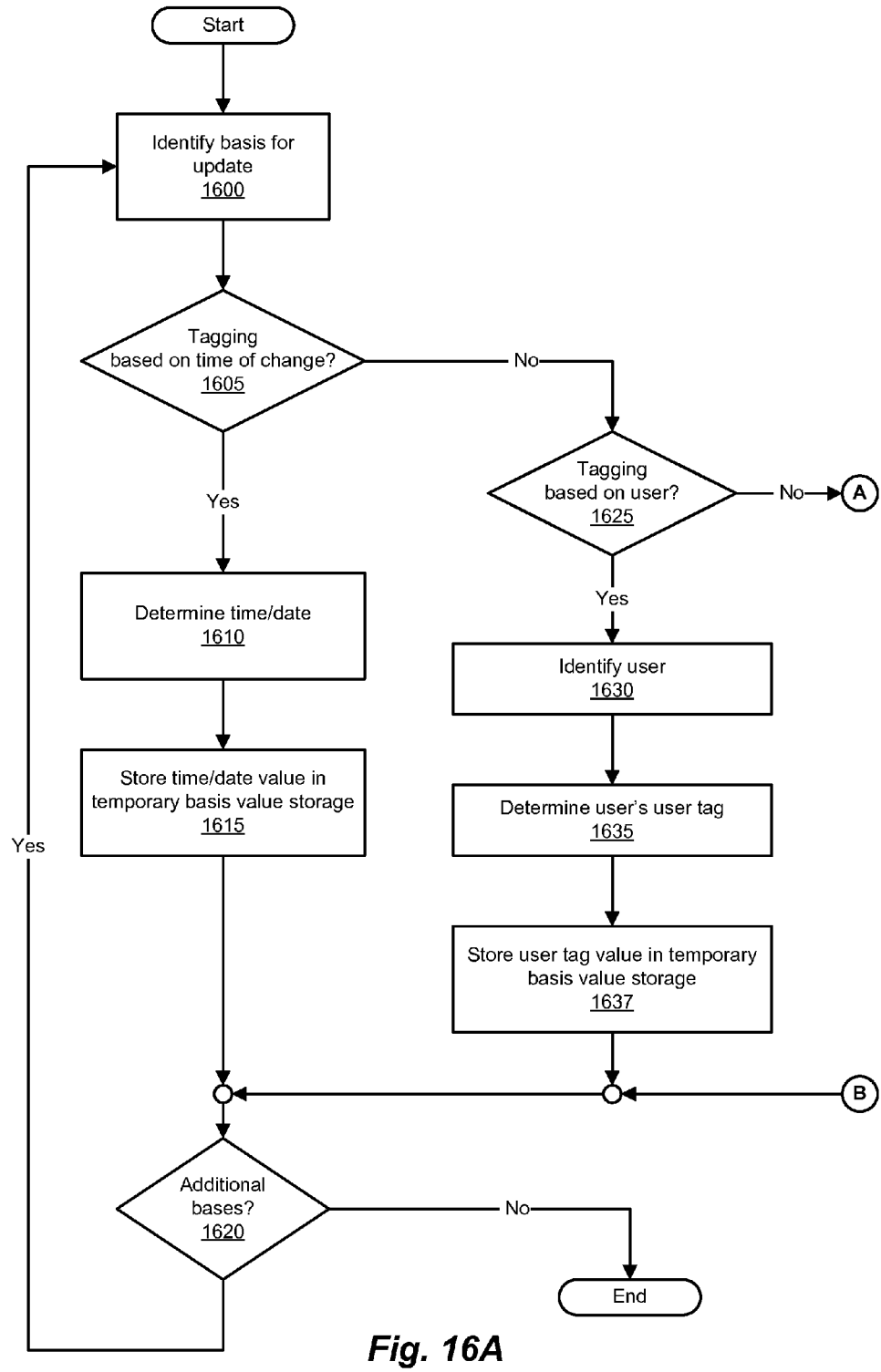
FIGS. 16A and 16B are simplified flow diagrams illustrating an example of a process determining bases for updating an object's tagging information and values thereof, according to embodiments of the methods and systems disclosed herein.
Figure 16B:
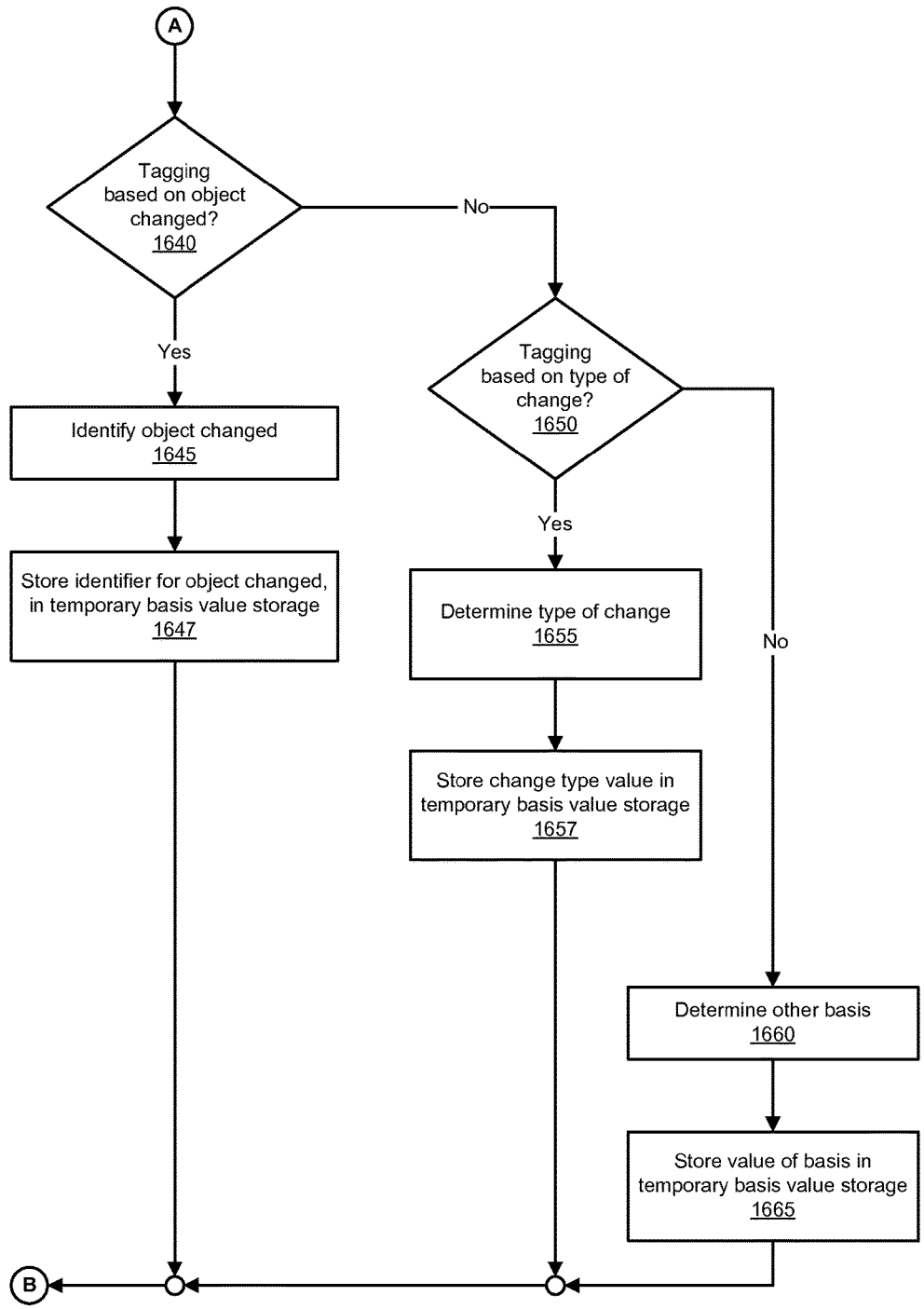

FIGS. 16A and 16B are simplified flow diagrams illustrating an example of a process determining bases for updating an object's tagging information and values thereof, according to embodiments of the methods and systems disclosed herein. The example process depicted in FIG. 16A for determining the basis for updating an object's tagging information (as well as the values thereof) begins with an identification of the basis for the update of the object (step 1600). As will be appreciated in light of the present disclosure, while the determinations of the basis for object tagging are described in a certain quarter, out of necessity, the order of such determinations and the inclusion/exclusion of any particular determination is not mandated thereby, particularly in view of the fact that the process and determinations depicted in FIGS. 16A and 16B are merely examples thereof.

Once the basis for the update has been identified (step 1600), a determination is made as to whether the tagging to be performed is based on the point in time at which the exchange was made (step 1605). If the object to be tagged is to be tagged based on the time that exchange was made, a determination is made as to, for example, the time and date of the change (step 1610). The time and date thus determined is then stored in a temporary basis value storage construct (step 1615). Next, a determination is made as to whether any additional bases for tagging the object are to be considered (step 1620). In making such a determination, the process depicted in FIGS. 16A and 16B allows for an object to be tagged based on multiple factors (bases). In so doing, such a process provides a powerful and flexible approach for tagging objects, supporting a rich variety of criteria by which objects can be tagged, and so, organized. For example, allowing an object to be tagged based on the time of the change, the user/group making the change, the type of change made, the object or objects changed, and/or combinations thereof, allows the administrator wide latitude in defining and organizing changes made to the objects, such that object changes (e.g., via delta files) can be implemented in an organized and thoughtful fashion.

If the change's time is not to be considered with regard to object tagging (step 1605), a determination is made as to whether object tagging is to be performed based on the identity of the user (or, alternatively, the group or groups to which a user belongs, or some other characteristic of the user implementing the change to the object) (step 1625). If the basis for object tagging is the user(s) identity (group membership or other characteristic) (step 1625), the user is identified in an appropriate manner (e.g., by user identifier, by group identifier, or by some other appropriate identifier) (step 1630). As noted earlier, a tag may identify a user individually, may identify a user's membership in a group, or provide a basis for using some other characteristic of a user. The user's user tag value is thus determined (step 1635), and then stored in temporary basis value storage for recordation in the appropriate object tag table (as per step 1530 of FIG. 15) (step 1637). As before, a determination is then made as to whether any additional bases for object tagging are to be examined (step 1620), and the process continues or concludes, as appropriate.

If the object tagging to be performed is based neither on the time of the change (step 1605), nor the characteristic of the user (step 1625), the process proceeds (via off-page connector "A") to a determination as to whether the object tagging to be performed is based on the object that was changed (step 1640). If object tagging is to be based on the object changed (step 1640), the object changed is identified (step 1645). Information regarding the object changed (e.g., the object identifier for the object changed) is stored in temporary basis value storage (step 1647). The process then returns (via off page connector "B") to a determination as to whether additional bases for object tagging are to be considered (step 1620). As before, the process either loops to the identification of the next basis for the update (step 1600), or concludes.

In similar fashion, a determination is made, in the case in which object tagging is not to be based on the object changed (step 1640), as to whether the basis for object tagging is related to the type of object being changed and/or the type of change made to the object (step 1650). If the basis for object tagging is the type of object/type of change (step 1650), a determination is made as to the type of object changed and/or the type of change made to the object (step 1655). Once that determination has been made, and the requisite change type value determines, the change type value thus obtained is stored in temporary basis value storage (step 1657). As before, the process proceeds (via off page connector "B") to a determination as to whether additional bases for object tagging are to be considered (step 1620). Also as before, if further bases are to be considered, the process loops to the identification of the next basis for update (step 1600), or concludes. If the bases for object tagging explicitly considered in the process of FIGS. 16A and 16B are not the basis at hand the process proceeds to a determination as to whether another basis should be used in evaluating the object tagging performed (step 1660). The value resulting from this determination is then stored (step 1665). The process once again proceeds (via off page connector B) to the determination as to whether additional bases need to be considered in performing the object tagging at hand (step 1620). Once again, the process either loops to the identification of the next basis for the update (step 1600), or the process concludes.

Figure 17:
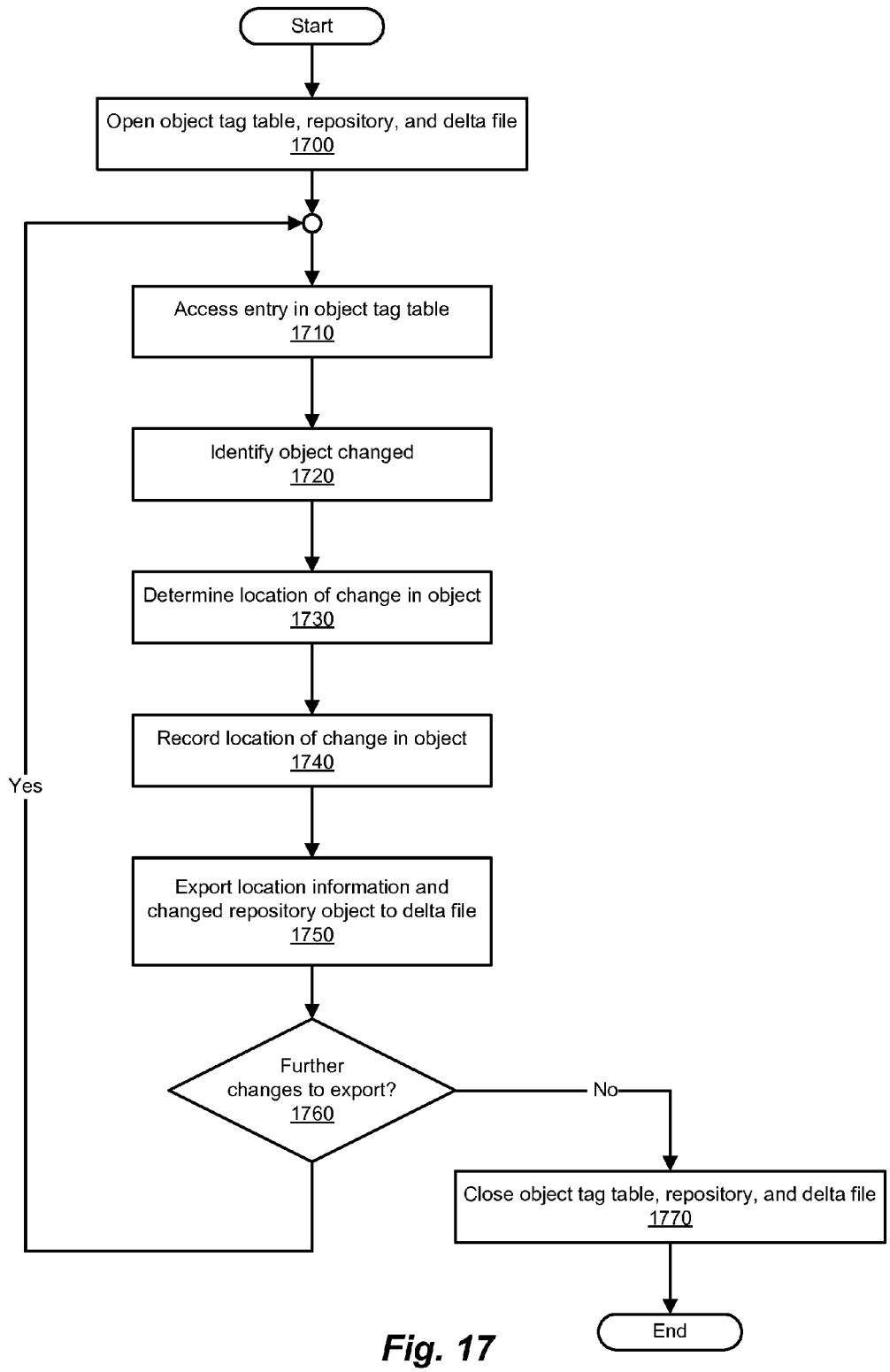
FIG. 17 is a simplified flow diagram illustrating an example of a process of generating a delta file from object tag table entries, according to embodiments of the methods and systems disclosed herein.

FIG. 17 is a simplified flow diagram illustrating an example of a process of generating a delta file from object tag table entries, according to embodiments of the methods and systems disclosed herein. As will be appreciated in light of the present disclosure, the processes depicted in FIGS. 15, 16A, and 16B result in the determination of bases for object tagging and values thereof, as well as the recordation of such changes in an object tag table according, for example, to the table definitions provided in FIGS. 10A, 10B, 10C, and 11. Once such information has been aggregated, a construct such as a delta file can be generated from that information. As will be further appreciated, given the fact that such object tagging minimizes the information that is needed to identify the elements of the objects thus changed (and so, tagged), the size of such constructs and the effort required to implement the changes reflected therein are minimized.

A process of generating a delta file from object tag table entries is thus presented in FIG. 17, and begins with the opening of the tag table, the repository, and the delta file in question (step 1700). Next, an entry in the object tag table is accessed (step 1710), and the object changed, as reflected in that entry, is identified (step 1720). As will be appreciated, such operations can be performed, for example, by a delta merge module such as delta merge module 840 of FIG. 8. Once the object to which the change has been performed has been identified, a determination is made as to the location of that change in the object (step 1730). An example of making such a determination (and the location thus identified) was described in connection with FIG. 9 and the object hierarchy depicted therein. The location of the change in the object hierarchy, thus determined, is then recorded (step 1740). Once the object that was changed (and tagged) and the location of the change in the object has been identified, information regarding the location and the object changed are exported to the delta file (step 1750). At this juncture, a determination is made as to whether there are further changes remaining to be exported to the delta file (step 1760). If further changes remain, the process loops back to the accessing of the next entry in the object tag table and the process continues in the manner earlier described. Alternatively, if no further changes need to be exported (step 1760), the process proceeds to closing the object tag table, the repository, and the delta file (step 1770). The process then concludes.

FIGS. 18A, 18B, 18C, 18D, and 18E are simplified block diagrams illustrating examples of various conflict scenarios and their handling with respect to object tagging, according to embodiments of the methods and systems disclosed herein. One of the goals of tracking repository changes is to capture the changes made to a given repository object, when making changes to such repository objects. In general, as noted earlier, repository changes made by a user via any of the various tools used to make changes to the objects stored in a master repository such as master repository 810 of FIG. 8 (e.g., information file import module 830, delta merge module 840, direct change entry module 850, check-in/check-out tracking module 860, and other such tools) are recorded in a tag object table such as those described earlier, when object tagging is enabled. However, conflicts can arise. For example, if users belonging to different tags modify the same object (e.g., the same element of the same object), a system such as that depicted as repository change tracking architecture 800 in FIG. 8 can be designed to display a conflict warning to one or both of the users. For example, when one user makes such a modification followed by an attempt by a second user to modify the same object, the resulting conflict can be displayed to the second user as a conflict warning, allowing the second user to take appropriate action. In such a scenario, the second user may wish to continue, or may prefer to resolve the conflict (and then continue). Various examples of such conflict scenarios, as well as the objects present during extraction (based on object tagging), are now described in connection with FIGS. 18A-18E.

Figure 18A:
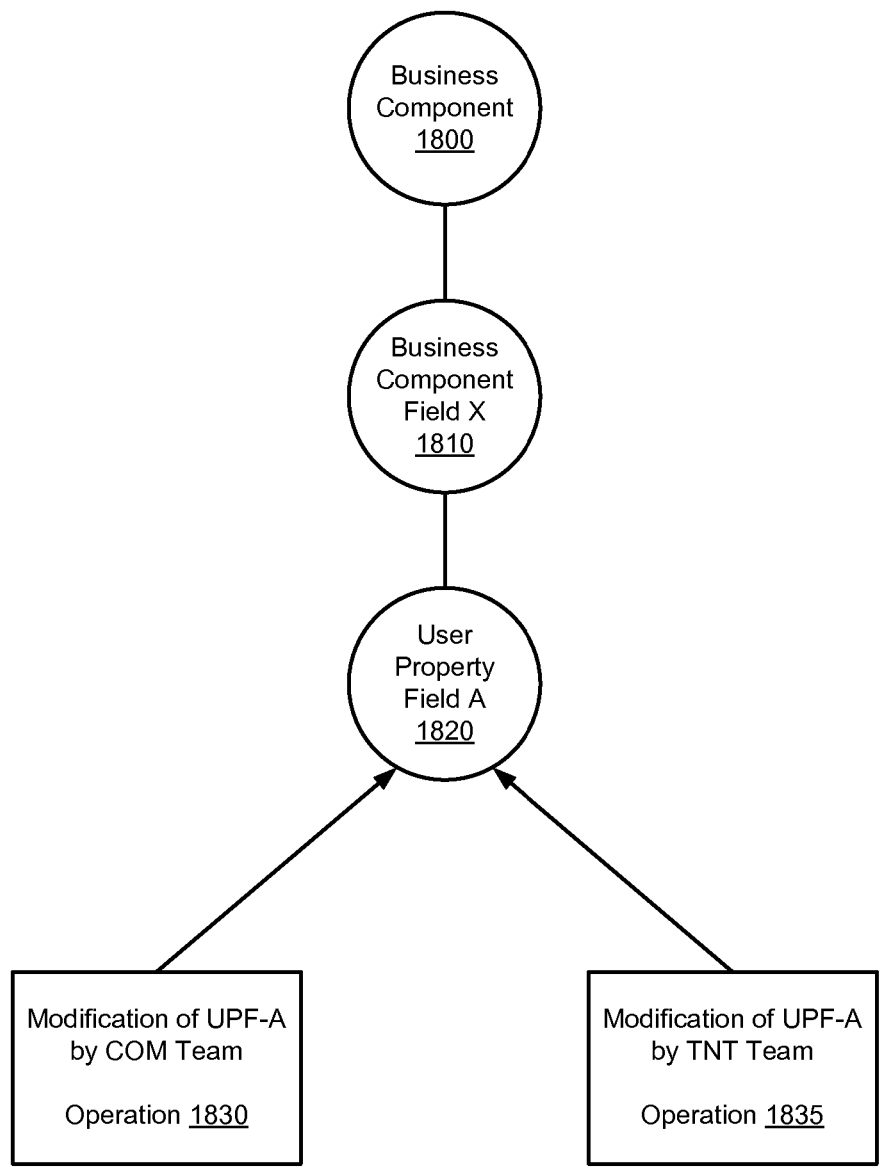
FIGS. 18A, 18B, 18C, 18D, and 18E are simplified block diagrams illustrating examples of various conflict scenarios and their handling with respect to object tagging, according to embodiments of the methods and systems disclosed herein.

FIG. 18A is a simplified block diagram illustrating an example of a conflict scenario in which the user belonging to COM team modifies an object followed by a member of TNT team and the handling thereof. In the scenario depicted in FIG. 18A, a business component 1800 is depicted as including a business component field X 1810 (with a value of "BC Field 1"), which, in turn, includes a user property field A 1820 (with a value of "Field UP1"). In this scenario, user property field A 1820 is modified by a member of COM team, which is designated in FIG. 18A as an operation 1830. No conflict exists, as there is no entry made in the object tag table and changes are allowed to be made to the master repository. A record is created for this object and associated with COM tag in the object tag table.

Subsequently, a member of TNT team (the second user) attempts to modify user property field A 1820, as represented by an operation 1835. An indication of a conflict is presented to the user. One of the following can happen:
 The second user can ignore the message and check in the changes. User property field A 1820 is modified and a record is created in the object tag table for TNT team, or
 The second user does not check in the changes.

With regard to the generation of a delta file reflecting this situation, both COM and TNT will have the latest value of "Field UP1".

Figure 18B:
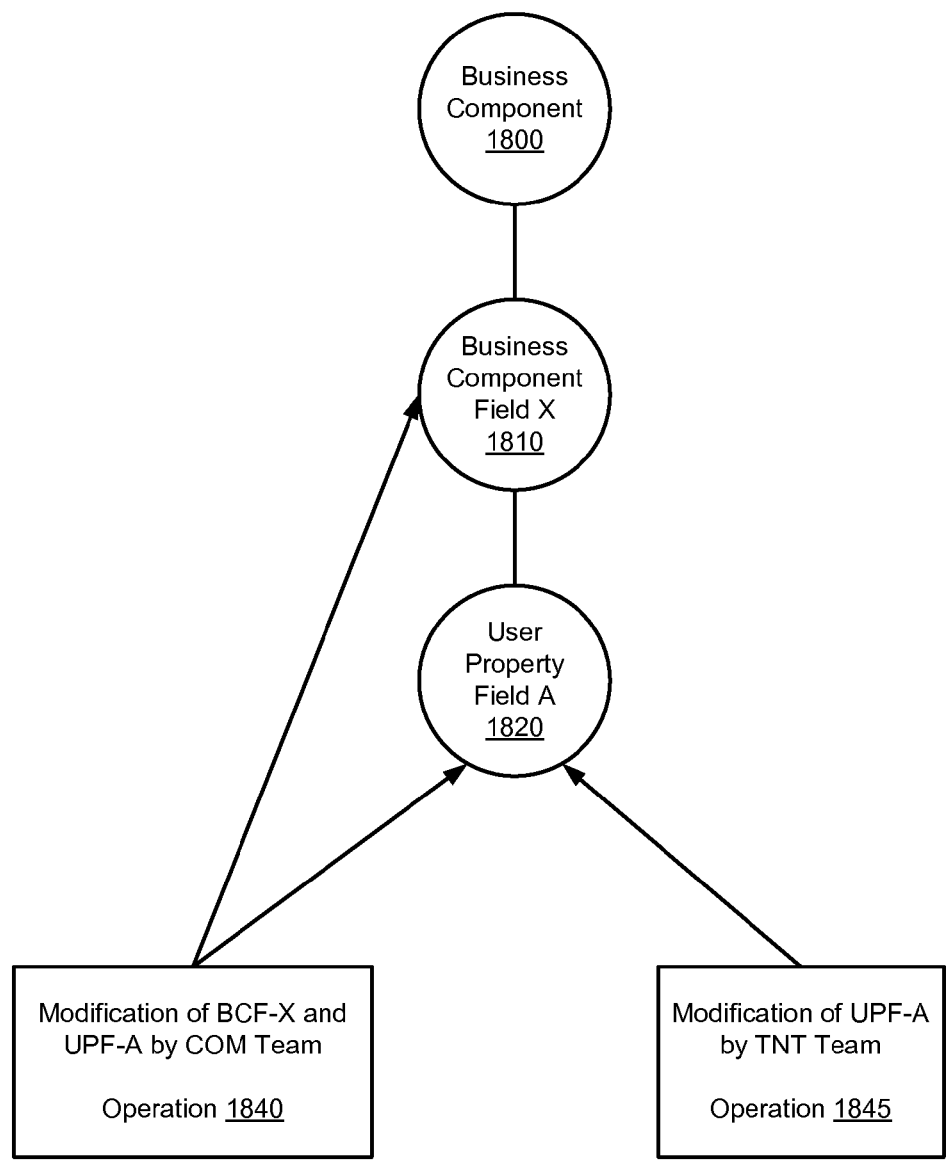

FIG. 18B depicts a conflict scenario in which business component and user property fields are changed by one user (a member of team COM), and an attempt is subsequently made to change the same user property field by another user (a member of team TNT). Thus, in the scenario depicted in FIG. 18B, a member of COM team modifies both business component field X 1810 and user property field A 1820. No conflict exists, as there is no entry made in the object tag table and changes are allowed to be made to the master repository. Two records are created for these objects (business component field X 1810 and user property field A 1820) and associated with COM tag in the object tag table.

Subsequently, a member of TNT team attempts to modify user property field A 1820 (operations 1840 and 1845, respectively). An indication of a conflict is presented to the user. One of the following can happen:
 The user can ignore the message and check in the changes. The "Field UP1" is modified and a record is created in the object tag table for TNT, or
 The second user does not check in the changes.

With regard to the generation of a delta file reflecting this situation, both COM and TNT will have the latest value of "Field UP1".

Figure 18C:
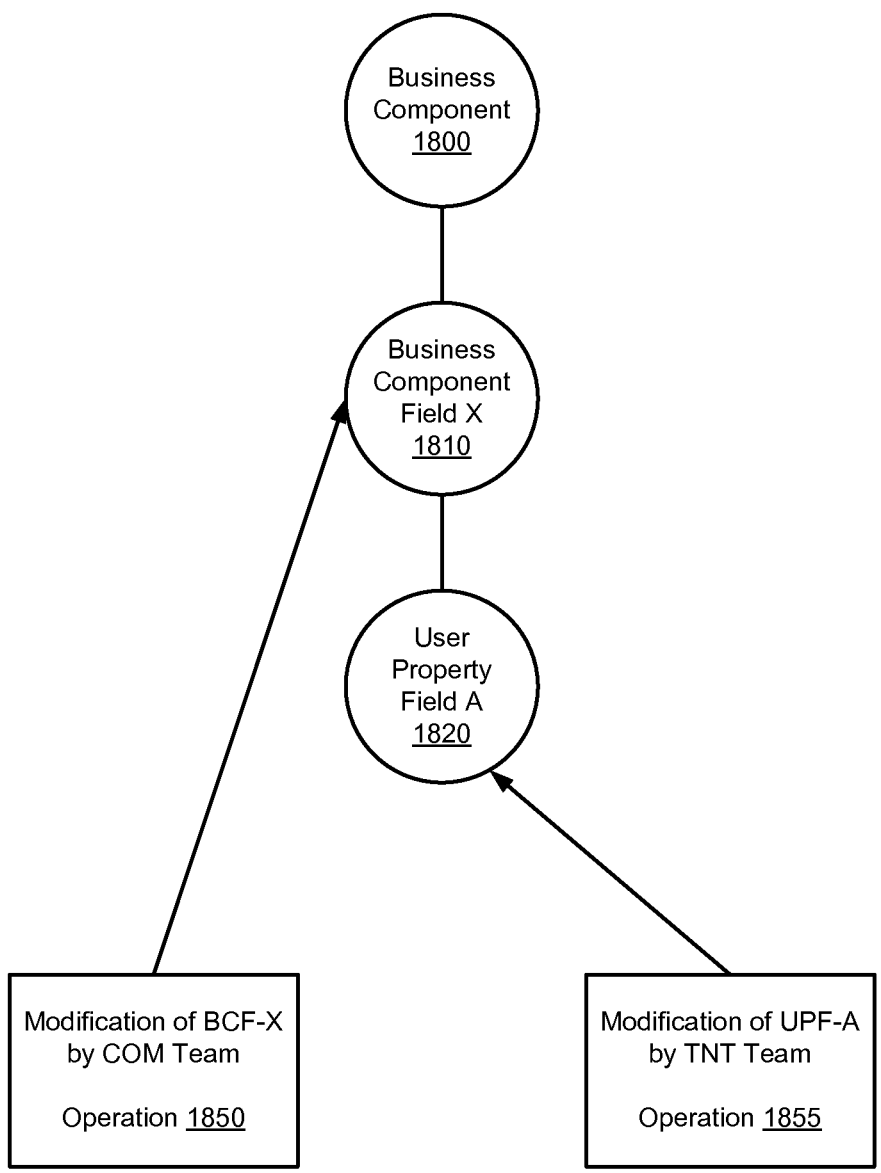

FIG. 18C depicts a conflict scenario in which one user modifies a business component field, while another user attempts to modify a user property field dependent thereon (as will be appreciated, this scenario is a variant of that depicted in FIG. 18B). In the scenario depicted in FIG. 18C, a member of COM team modifies business component field X 1810, depicted in FIG. 18C as an operation 1850. No conflict exists, as there is no entry made in the object tag table and changes are allowed to be made to the master repository. Two records are created for these objects (business component field X 1810 and user property field A 1820) and associated with COM tag in the object tag table.

Subsequently, a member of TNT team attempts to modify user property field A 1820, which is depicted in FIG. 18C as an operation 1855. No warning of conflict is presented, as the scenario does not give rise to one directly. With regard to the generation of a delta file reflecting this situation, TNT team will have the latest value of "Field UP1" and "BC Field 1", but COM team will have only the "BC Field 1".

Figure 18D:
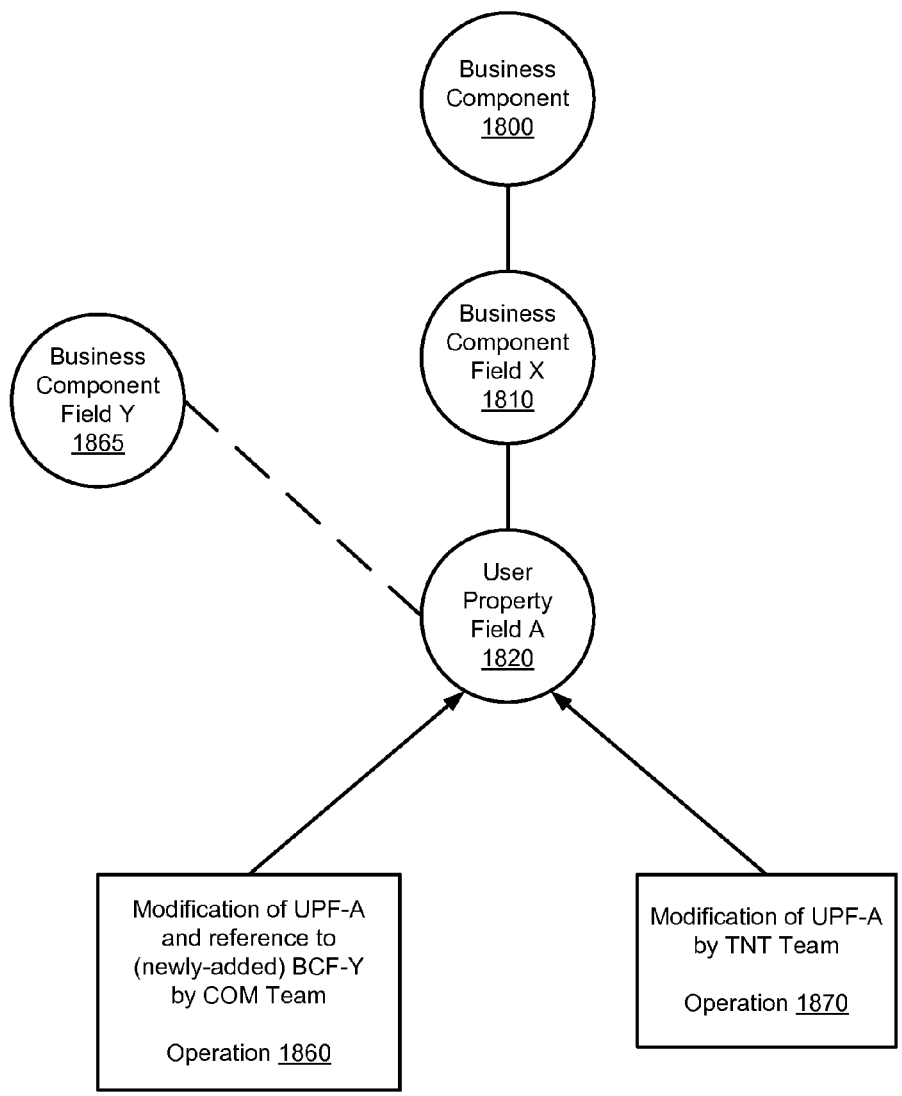

FIG. 18D depicts a scenario in which a user not only modifies a user property field, but adds a new business component field as a reference thereto, after which another user attempts to modify the same user property field. In the scenario depicted in FIG. 18D, a member of COM team modifies user property field A 1820, but also adds a reference to a newly-added business component field, depicted in FIG. 18D as a business component field Y 1865 (with a value of "BC Field 2"). No conflict exists, as there is no entry made in the object tag table and changes are allowed to be made to the master repository. Two records are created for these objects (user property field A 1820 and business component field Y 1865), and associated with COM tag in the object tag table.

Subsequently, a member of TNT team (the second user) attempts to modify user property field A 1820, which is depicted in FIG. 18D as an operation 1870, but is not aware of the newly-added reference to business component field Y 1865. An indication of a conflict, as with the scenario depicted in FIG. 18A, is presented to the user. One of the following can happen:
 The second user can ignore the message and check in the changes. User property field A 1820 is modified and a record is created in the object tag table for TNT team, or
 The second user does not check in the changes.

It will be appreciated that, in the first alternative, the delta file extracted for COM team would operate normally. However, the delta file extraction for TNT team would fail as user property field A 1820 bears a reference to business component field Y 1865, which is not a present. In a check-out/check-in process, such as that described earlier, such a situation should be detected as a conflict and resolved earlier, during check-in process. With regard to the generation of a delta file reflecting this situation, both COM and TNT will have the latest value of "Field UP1" and "BC Field 1".

Figure 18E:
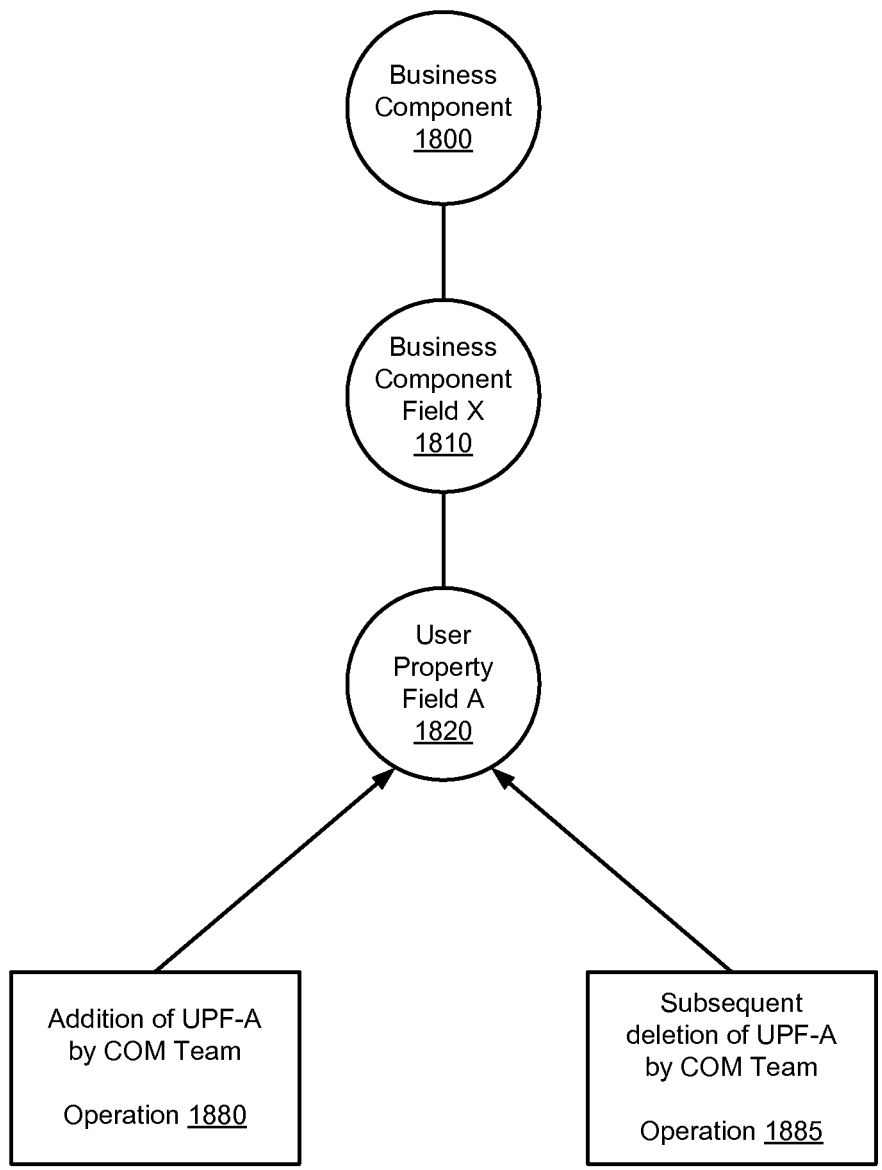

FIG. 18E depicts a conflict scenario in which a user adds (or modifies) an element of a business object, and then later attempts to delete that element. A conflict can occur in this scenario if, for example, in the interim another user has modified the element thus added (and attempted to be deleted). In the scenario depicted in FIG. 18E, a user (e.g., a member of COM team) adds user property field A 1820 to business component field X 1810 (and so, business component 1800), which is depicted in FIG. 18E as an operation 1880. No conflict exists, as there is no entry made in the object tag table and changes are allowed to be made to the master repository. A record is created for this object and associated with COM tag in the object tag table.

Subsequently, that (or another) member of COM team attempts to delete user property field A 1820, which is depicted in FIG. 18E as an operation 1885. As noted, a conflict can arise in a situation in which another user (associated with a different tag) has modified user property field A 1820 and thus making the deletion of user property field A 1820 problematic. One of the following can happen:
 If user property field A 1820 is not used by any other team, then user property field A 1820 can be deleted and the record from object tag table removed, or
 If user property field A 1820 is referenced by another team (e.g., TNT team), then user property field A 1820 should not be allowed to be deleted, but the record from object tag table for COM team can be removed.

With regard to the generation of a delta file in this situation, COM team will not have a "Field UP1" entry, since that entry was deleted, but "Field UP1" can be present for TNT team.

An Example Computing and Network Environment

As described above, the systems described herein can be implemented using a variety of computer systems and networks. Examples of such computing and network environments are described below with reference to FIGS. 19 and 20.

Figure 19:
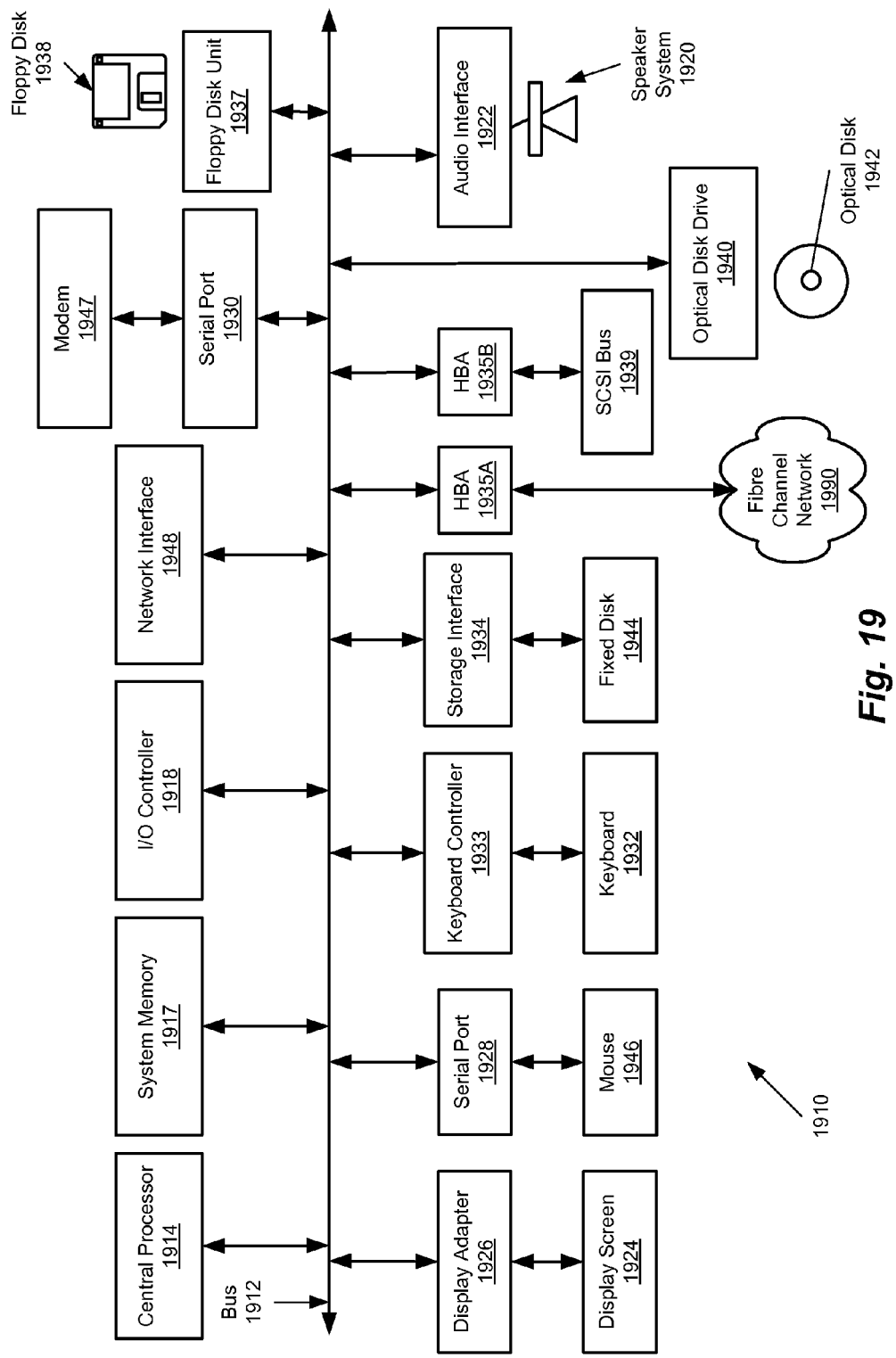
FIG. 19 is a block diagram depicting a computer system suitable for implementing aspects of systems according to embodiments of systems such as those disclosed herein.

FIG. 19 depicts a block diagram of a computer system 1910 suitable for implementing aspects of the present invention. Computer system 1910 includes a bus 1912 which interconnects major subsystems of computer system 1910, such as a central processor 1914, a system memory 1917 (typically RAM, but which may also include ROM, flash RAM, or the like), an input/output controller 1918, an external audio device, such as a speaker system 1920 via an audio output interface 1922, an external device, such as a display screen 1924 via display adapter 1926, serial ports 1928 and 1930, a keyboard 1932 (interfaced with a keyboard controller 1933), a storage interface 1934, a floppy disk drive 1937 operative to receive a floppy disk 1938, a host bus adapter (HBA) interface card 1935A operative to connect with a Fibre Channel network 1990, a host bus adapter (HBA) interface card 1935B operative to connect to a SCSI bus 1939, and an optical disk drive 1940 operative to receive an optical disk 1942. Also included are a mouse 1946 (or other point-and-click device, coupled to bus 1912 via serial port 1928), a modem 1947 (coupled to bus 1912 via serial port 1930), and a network interface 1948 (coupled directly to bus 1912).

Bus 1912 allows data communication between central processor 1914 and system memory 1917, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 1910 are generally stored on and accessed via a computer-readable medium, such as a hard disk drive (e.g., fixed disk 1944), an optical drive (e.g., optical drive 1940), a floppy disk unit 1937, or other storage medium. Additionally, applications can be in the form of electronic signals modulated in accordance with the application and data communication technology when accessed via network modem 1947 or interface 1948.

Storage interface 1934, as with the other storage interfaces of computer system 1910, can connect to a standard computer-readable medium for storage and/or retrieval of information, such as a fixed disk drive 1944. Fixed disk drive 1944 may be a part of computer system 1910 or may be separate and accessed through other interface systems. Modem 1947 may provide a direct connection to a remote server via a telephone link or to the Internet via an internet service provider (ISP). Network interface 1948 may provide a direct connection to a remote server via a direct network link to the Internet via a POP (point of presence). Network interface 1948 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 19 need not be present to practice the present invention. The devices and subsystems can be interconnected in different ways from that shown in FIG. 19. The operation of a computer system such as that shown in FIG. 19 is readily known in the art and is not discussed in detail in this application. Code to implement the present invention can be stored in computer-readable storage media such as one or more of system memory 1917, fixed disk 1944, optical disk 1942, or floppy disk 1938. The operating system provided on computer system 1910 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 20:
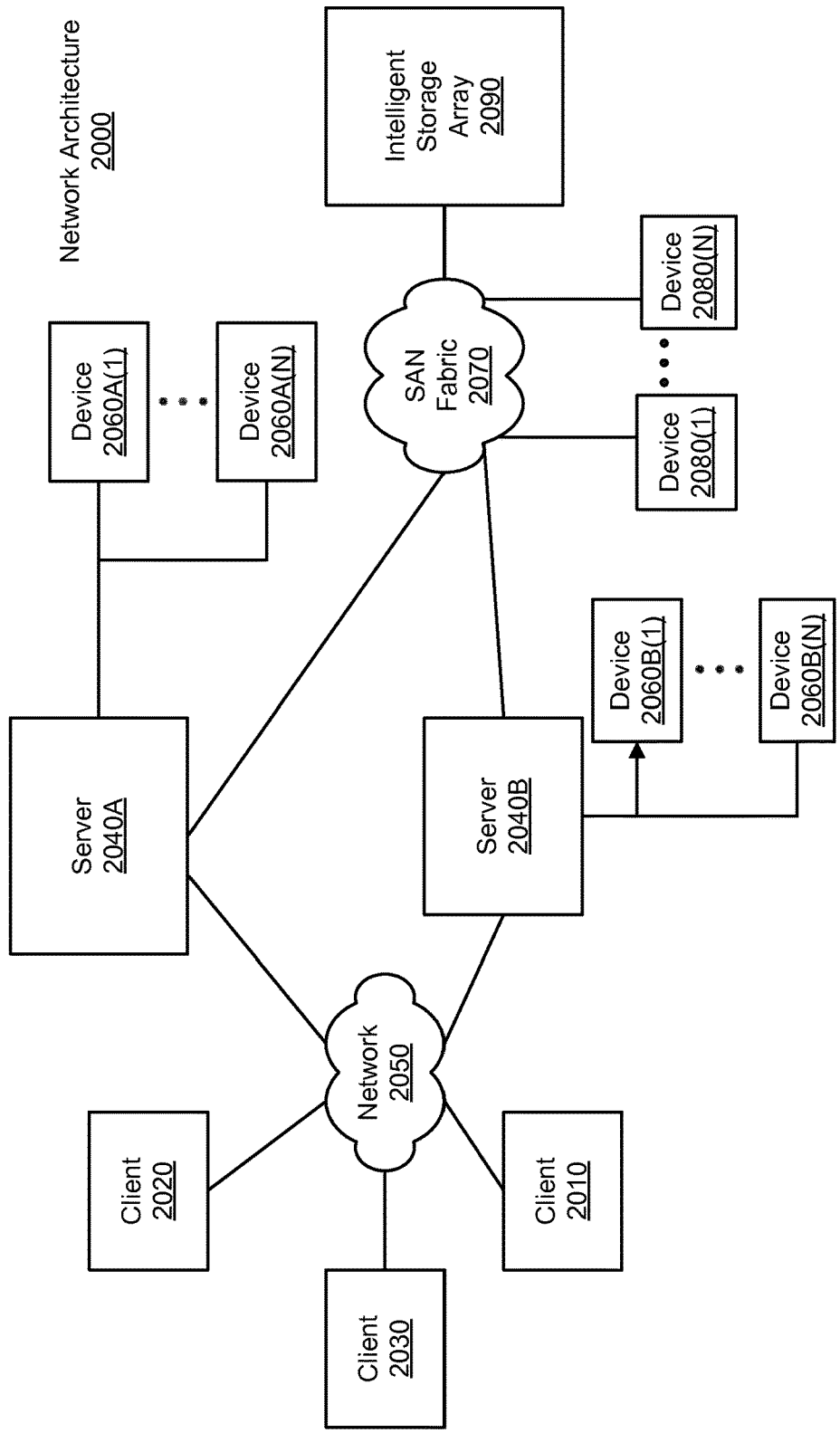
FIG. 20 is a block diagram depicting a network architecture suitable for implementing aspects of systems according to embodiments of systems such as those disclosed herein.

FIG. 20 is a block diagram depicting a network architecture 2000 in which client systems 2010, 2020 and 2030, as well as storage servers 2040A and 2040B (any of which can be implemented using computer system 2010), are coupled to a network 2050. Storage server 2040A is further depicted as having storage devices 2060A(1)-(N) directly attached, and storage server 2040B is depicted with storage devices 2060B(1)-(N) directly attached. Storage servers 2040A and 2040B are also connected to a SAN fabric 2070, although connection to a storage area network is not required for operation of the invention. SAN fabric 2070 supports access to storage devices 2080(1)-(N) by storage servers 2040A and 2040B, and so by client systems 2010, 2020 and 2030 via network 2050. Intelligent storage array 2090 is also shown as an example of a specific storage device accessible via SAN fabric 2070.

With reference to computer system 2010, modem 2047, network interface 2048 or some other method can be used to provide connectivity from each of client computer systems 2010, 2020 and 2030 to network 2050. Client systems 2010, 2020 and 2030 are able to access information on storage server 2040A or 2040B using, for example, a web browser or other client software (not shown). Such a client allows client systems 2010, 2020 and 2030 to access data hosted by storage server 2040A or 2040B or one of storage devices 2060A(1)-(N), 2060B(1)-(N), 2080(1)-(N) or intelligent storage array 2090. FIG. 20 depicts the use of a network such as the Internet for exchanging data, but the present invention is not limited to the Internet or any particular network-based environment.

OTHER EMBODIMENTS

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing describes embodiments including components contained within other components (e.g., the various elements shown as components of computer system 1910). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof, including the specialized systems illustrated in the figures described herein.

The present invention has been described in the context of fully functional computer systems; however, those skilled in the art will appreciate that the present invention is capable of being distributed as a program product in a variety of forms, and that the present invention applies equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment of the invention can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed is:

1. A computer-implemented method comprising:
    receiving, by a computing system, an incremental feature package, wherein
        the incremental feature package comprises one or more revisions to be made to a repository, the repository including a first set of data that provides a logical construction for the interpretation of a second set of data stored in an associated database, the repository storing a third set of data describing one or more objects, and further wherein
        the one or more revisions include information for updating a portion of at least one first object stored in the repository, the first object comprising a plurality of components, and
        the incremental feature package comprises a first delta file, the first delta file being generated based at least in part on a location of a change in the first object and an object tag table comprising the change in the first object;
    causing, by the computing system, the one or more revisions to be merged with the repository, wherein the one or more revisions update the portion of the first object stored in the repository; and
    causing, by the computing system, a schema definition of the associated database to be synchronized with a schema definition of the repository.

2. The method of claim 1, wherein
    the repository comprises one or more customizations, and the one or more customizations were made by a user.

3. The method of claim 2, further comprising:
    customizing the repository, wherein
        the customizing results in the one or more customizations,
        the one or more customizations are configured to customize an application program, and
        the application program is configured to access the repository.

4. The method of claim 2, wherein the customizing comprises:
    incorporating a reusable module into an end-user created module.

5. The method of claim 4, wherein
    the reusable module is an object, and
    the object is stored in the repository.

6. The method of claim 4, further comprising:
    detecting a conflict between the end-user created module and an existing module, wherein
        the end-user created module is the result of applying the one or more customizations to the reusable module.

7. The method of claim 1, wherein the object tag table comprises:
a user tag associated with an user associated with the repository,
a first object tag associated with the first object, and
information describing the change in the first object, wherein the information comprises:
a conflict information describing that the change to the first object, based on an object hierarchy, creates a conflict with a second object,
an instruction from the user to implement the change,
changes in the second object to resolve the conflict, and
a record describing that the change to the first object is associated with the repository;
wherein generating the first delta file is further based on the change in the second object;
wherein causing the schema definition of the associated database to be synchronized with the schema definition of the repository comprises:
generating a second delta file based on the object tag table, wherein the second delta file does not contain the change in the first object and the change in the second object, and
causing the second delta file to be merged with the associated database.

8. A computer system comprising:
a processor;
a computer-readable storage medium coupled to the processor; and
a plurality of instructions, encoded in the computer-readable storage medium and configured to cause the processor to
receive an incremental feature package, wherein
the incremental feature package comprises one or more revisions to be made to a repository, the repository including a first set of data that provides a logical construction for the interpretation of a second set of data stored in an associated database, the repository storing a third set of data describing one or more objects, and further wherein
the one or more revisions include information for updating a portion of at least one first object stored in the repository, the first object comprising a plurality of components, and
the incremental feature package comprises a first delta file, the first delta being generated based at least in part on a location of a change in the first object and an object tag table comprising the change in the first object;
cause the one or more revisions to be merged with the repository, wherein
the one or more revisions update the portion of the first object stored in the repository; and
causing a schema definition of the associated database to be synchronized with a schema definition of the repository.

9. The computer system of claim 8, wherein
the repository comprises one or more customizations, and
the one or more customizations were made by a user.

10. The computer system of claim 9, wherein the plurality of instructions is further configured to cause the processor to:
customize the repository, wherein
execution of the instructions configured to cause the processor to customize results in the one or more customizations,
the one or more customizations are configured to customize an application program, and
the application program is configured to access the repository.

11. The computer system of claim 10, wherein the plurality of instructions configured to cause the processor to customize the repository is further configured to cause the processor to:
incorporate a reusable module into an end-user created module.

12. The computer system of claim 11, wherein
the reusable module is an object, and
the object is stored in the repository.

13. The computer system of claim 10, wherein the plurality of instructions configured to cause the processor to apply the one or more revisions to the repository is further configured to cause the processor to:
associate a user with a tag; and
track a customization made to an object, wherein
the object is stored in the repository, and
the tracking is performed using the tag.

14. The computer system of claim 8, wherein the plurality of instructions is further configured to cause the processor to:
detect a conflict between the end-user created module and an existing module, wherein
the end-user created module is the result of applying the one or more customizations to the reusable module.

15. A computer program product comprising:
a plurality of instructions, comprising
a set of instructions, executable on a computer system, configured to receive an incremental feature package, wherein
the incremental feature package comprises one or more revisions to be made to a repository, the repository including a first set of data that provides a logical construction for the interpretation of a second set of data stored in an associated database, the repository storing a third set of data describing one or more objects, and further wherein
the one or more revisions include information for updating a portion of at least one first object stored in the repository, the first object comprising a plurality of components, and
the incremental feature package comprises a first delta file, the first delta file being generated based at least in part on a location of a change in the first object and an object tag table comprising the change in the first object;
a set of instructions, executable on the computer system, configured to cause the one or more revisions to be merged with the repository, wherein the one or more revisions update the portion of the first object stored in the repository;
a set of instructions, executable on the computer system, configured to cause a schema definition of the associated database to be synchronized with a schema definition of the repository; and
a computer-readable storage medium, wherein the instructions are encoded in the computer-readable storage medium.

16. The computer program product of claim 15, wherein the repository comprises one or more customizations, and the one or more customizations were made by a user.

17. The computer program product of claim 16, wherein the instructions further comprise:

a set of instructions, executable on the computer system, configured to customize the repository, wherein
the set of instructions results in the one or more customizations,
the one or more customizations are configured to customize an application program, and
the application program is configured to access the repository.
18. The computer program product of claim 17, wherein the third set of instructions comprises:
a set of instructions, executable on the computer system, configured to incorporate a reusable module into an end-user created module, wherein
the reusable module is an object, and
the object is stored in the repository.
19. The computer program product of claim 17, wherein the second set of instructions comprises:

a subset of instructions, executable on the computer system, configured to associate a user with a tag; and
a subset of instructions, executable on the computer system, configured to track a customization made to an object, wherein
the object is stored in the repository, and
the tracking is performed using the tag.
20. The computer program product of claim 15, wherein the instructions further comprise:
a set of instructions, executable on the computer system, configured to detect a conflict between
the end-user created module and an existing module, wherein
the end-user created module is the result of applying the one or more customizations to the reusable module.

* * * * *

UNITED STATES PATENT AND TRADEMARK OFFICE
CERTIFICATE OF CORRECTION

PATENT NO. : 10,339,113 B2
APPLICATION NO. : 14/492469
DATED : July 2, 2019
INVENTOR(S) : Billapati et al.

Page 1 of 1

It is certified that error appears in the above-identified patent and that said Letters Patent is hereby corrected as shown below:

In the Specification

In Column 3, Line 42, delete "apparati" and insert -- apparatus --, therefor.

In Column 6, Line 28, after "conflicts" insert -- . --.

In Column 13, Line 64, delete "manner" and insert -- manner. --, therefor.

In the Claims

In Column 29, Line 47, in Claim 8, after "delta" insert -- file --.

Signed and Sealed this
Twenty-eighth Day of July, 2020

Andrei Iancu
*Director of the United States Patent and Trademark Office*